United States Patent
Wu et al.

(10) Patent No.: US 10,742,272 B2
(45) Date of Patent: Aug. 11, 2020

(54) CHANNEL INFORMATION FEEDBACK METHOD AND APPARATUS, TERMINAL AND BASE STATION

(71) Applicant: ZTE CORPORATION, Shenzhen, Guangdong (CN)

(72) Inventors: Hao Wu, Shenzhen (CN); Jianxing Cai, Shenzhen (CN); Yu Ngok Li, Shenzhen (CN); Yijian Chen, Shenzhen (CN); Zhaohua Lu, Shenzhen (CN); Huahua Xiao, Shenzhen (CN); Yong Li, Shenzhen (CN); Yuxin Wang, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 0 days.

(21) Appl. No.: 16/336,301

(22) PCT Filed: Jul. 19, 2017

(86) PCT No.: PCT/CN2017/093556
§ 371 (c)(1),
(2) Date: Mar. 25, 2019

(87) PCT Pub. No.: WO2018/059087
PCT Pub. Date: Apr. 5, 2018

(65) Prior Publication Data
US 2019/0312615 A1   Oct. 10, 2019

(30) Foreign Application Priority Data

Sep. 30, 2016   (CN) .......................... 2016 1 0879367

(51) Int. Cl.
*H04B 7/04* (2017.01)
*H04B 7/0417* (2017.01)
(Continued)

(52) U.S. Cl.
CPC ............. *H04B 7/0417* (2013.01); *H04B 7/06* (2013.01); *H04B 7/063* (2013.01); *H04B 7/0626* (2013.01);
(Continued)

(58) Field of Classification Search
CPC ...... H04B 7/0417; H04B 7/06; H04B 7/0626; H04B 7/063; H04B 7/0848; H04L 1/00; H04L 1/0073
(Continued)

(56) References Cited

U.S. PATENT DOCUMENTS

2008/0165875 A1   7/2008  Mundarath et al.
2011/0164668 A1*  7/2011  Hoek ................... H04B 7/0619
                                                        375/224
(Continued)

FOREIGN PATENT DOCUMENTS

CN   101527622 A   9/2009
CN   102739344 A   10/2012
(Continued)

OTHER PUBLICATIONS

International Search Report and Written Opinion for International Appl. No. PCT/CN2017/093556, dated Oct. 31, 2017.

*Primary Examiner* — Michael R Neff
(74) *Attorney, Agent, or Firm* — Foley & Lardner LLP

(57) ABSTRACT

Provided is a channel information feedback method and apparatus, a terminal, and a base station. The method includes: determining, by a terminal, a feedback state parameter of channel information, where the channel information includes at least one of a number M of precoding vectors $v_1, v_2, \ldots, v_M$, a number G of amplitude coefficients $A_1, A_2, \ldots, A_G$, or a number K of phase coefficients $P_1, P_2, \ldots, P_K$, where M, G and K are all integers greater than or equal to 0; and feeding back, by the terminal, the channel (Continued)

information according to the determined feedback state parameter.

20 Claims, 4 Drawing Sheets

(51) Int. Cl.
    *H04B 7/06*         (2006.01)
    *H04B 7/08*         (2006.01)
    *H04L 1/00*         (2006.01)

(52) U.S. Cl.
    CPC ............. *H04B 7/0848* (2013.01); *H04L 1/00* (2013.01); *H04L 1/0073* (2013.01)

(58) Field of Classification Search
    USPC ........................................................ 375/262
    See application file for complete search history.

(56) References Cited

U.S. PATENT DOCUMENTS

| | | | | |
|---|---|---|---|---|
| 2012/0281783 A1* | 11/2012 | Cheng | ................... | H04B 7/0456 375/295 |
| 2016/0119097 A1* | 4/2016 | Nam | .................... | H04L 5/0023 370/329 |
| 2016/0323025 A1* | 11/2016 | Liu | ...................... | H04B 7/0478 |

FOREIGN PATENT DOCUMENTS

| | | | |
|---|---|---|---|
| CN | 103095419 A | 5/2013 | |
| CN | 103095427 A | 5/2013 | |

\* cited by examiner

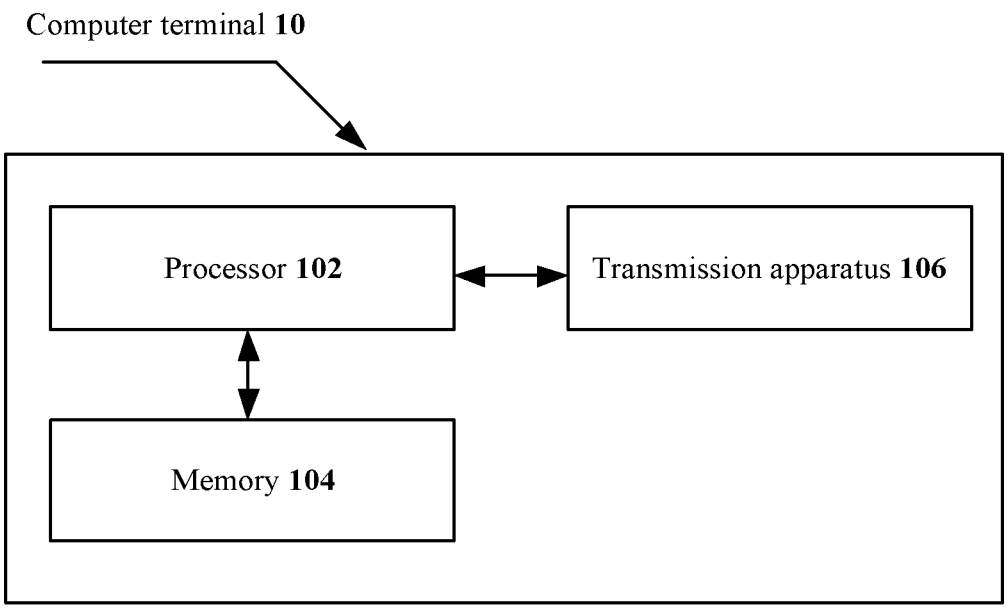

FIG. 1

A terminal determines a feedback state parameter of channel information, where the channel information includes at least one of a number M of precoding vectors $v_1, v_2, \ldots, v_M$, a number G of amplitude coefficients $A_1, A_2, \ldots, A_G$, or a number K of phase coefficients $P_1, P_2, \ldots, P_K$, where M, G and K are all integers greater than or equal to 0 — S202

The terminal feeds back the channel information according to the determined feedback state parameter — S204

CHANNEL INFORMATION FEEDBACK METHOD AND APPARATUS, TERMINAL AND BASE STATION

CROSS-REFERENCE TO RELATED APPLICATIONS

This is a National Stage Application, under 35 U.S.C. 371, of International Patent Application No. PCT/CN2017/093556, filed on Jul. 19, 2017, which claims priority to Chinese Patent Application No. 201610879367.4 filed on Sep. 30, 2016, contents of both of which are incorporated herein by reference in their entireties.

TECHNICAL FIELD

The present disclosure relates to the field of communications and, in particular, to a channel information feedback method and apparatus, a terminal and a base station.

BACKGROUND

In a wireless communication system, a transmitting end and a receiving end generally use multiple antennas for transmission and reception to reach a higher rate. One principle of the multiple-input-multiple-output (MIMO) technology is to implement multi-layer transmission which matches channel characteristics by using some channel characteristics, thereby effectively improving system performance. Significant performance improvement is obtained without increasing a bandwidth and power, so that the MIMO technology is very promising and has wide applications in the current system. For example, the Long Term Evolution (LTE) system and the Long Term Evolution-Advanced (LTE-A) system have multiple transmission modes for a multi-antenna technology, i.e., a transmission mode 2 to a transmission mode 10. The multi-antenna technology involves many concepts and techniques. To help understand and describe the content of the present disclosure, some concepts of key techniques will be introduced below.

Generally, channel state information (CSI) is fed back in two manners, that is, periodic feedback and aperiodic feedback. For example, in the LTE/LTE-A system, a physical uplink control channel (PUCCH) is adopted to perform the periodic feedback and a physical uplink shared channel (PUSCH) is adopted to perform the aperiodic feedback. A terminal mainly feeds back the CSI in two manners. A base station may configure the terminal to measure and quantize the channel information and perform the periodic feedback on the quantized channel state information (CSI) through the PUCCH. The CSI includes a rank indicator (RI)/precoding matrix indicator (PMI)/channel quality indication (CQI). When necessary, the base station may also aperiodically trigger the terminal to report the CSI (including the RI/PMI/CQI) mainly through the PUSCH, implement the feedback with a high real-time feature and the higher CSI quantization accuracy.

The basic principle of codebook-based channel information quantization feedback is briefly described as follows. Assuming that a limited feedback channel capacity is B bps/Hz, the number of available codewords is $N=2^B$. The feature vector space of a channel matrix is quantized to form a codebook space $\Re =\{F_1, F_2 \ldots F_N\}$. The transmitting end and the receiving end jointly store or generate the codebook in real time (which is the same at the transmitting end and the receiving end). According to the channel matrix H obtained by the receiving end, the receiving end selects a codeword $\hat{F}$, which best matches the channel, from $\Re$ according to a certain rule and feeds back a serial number i of the codeword (that is, the PMI) to the transmitting end. The transmitting end finds the corresponding precoding codeword $\hat{F}$ according to the serial number i and obtains the channel information, where $\hat{F}$ represents the feature vector information of the channel.

The principle for constructing the codeword in the LTE system is introduced as follows. The codebook of the LTE is also evolving with the evolution of a standard release. In the release 8 and the release 9, the 4-antenna codebook and the 2-antenna codebook both are in a form of single codeword. There is only one PMI, the value of which is represented as $i=1, \ldots, N_{11}$, where $N_{11}$ is the number of codewords. For an 8-antenna codebook in the release 10 and a 4-antenna codebook in the release 12, a dual codebook feedback form is used. That is, the codeword may be written as $W=W_1*W_2$, where $W_1$ is a long-term feedback codebook called a first codebook and $W_2$ represents a short-term feedback codebook called a second codebook. $W_2$ is adopted to select one from $M_1$ alternative beams in codewords of $W_1$ and select a beam selection polarization phase, co-phasing, for each polarization direction at the same data layer. Each codeword in $W_2$ is quantized and fed back by $PMI_2$ whose value is $i_2=1, M_1$, where $M_1$ is the number of $W_2$. For details, reference may be made to the LTE release 10.

The codewords in releases before the release 12 are targeted for 1D (one-dimensional) antenna arrays and belong to 1D codewords. In a design of the codebook in the release 13, the dimension of the codebook becomes larger due to the use of more antennas. A topology of antennas is also generally planar, that is, 2D (two-dimensional) codewords are designed for antennas with two dimensions. Therefore, each beam in the first codebook $W_1$ has a two-dimensional form $v_m \otimes u_n$, where $v_m$ and $u_n$ are respectively discrete Fourier transform (DFT) vectors in the first dimension and the second dimension, $v_m \otimes u_n$ represent a kronecker product of $v_m$ and $u_n$, where $m=1, 2, \ldots, B_1$, and $n=1, 2, \ldots, B_2$. The number of ports (in the present disclosure, the ports include an antenna/port/transport unit/element/array element and another apparatus capable of sending signals) is $N_1$ and the number of ports in the second dimension is $N_2$. Oversampling at $O_1$ times is performed in the DFT corresponding to the ports in the first dimension and oversampling at $O_2$ times is performed in the DFT corresponding to the ports in the second dimension. The number of DFT vectors of antennas in the first dimension or the second dimension is a multiple of an oversampling factor of the number of ports and thus $B_1=N_1*O_1$ and $B_2=N_2*O_2$, where $O_1$ is an oversampling factor in the first dimension and $O_2$ is an oversampling factor in the second dimension. A codebook in the first dimension of the first codebook is represented by $PMI_{11}$ whose value is $i_{11}=1, \ldots, N_{11}$, and a codebook in the second dimension of the first codebook is represented by $PMI_{12}$ whose value is $i_{12}=1, \ldots, N_{12}$. For each index of $PMI_{11}$ and $PMI_{12}$, the number $M_1$ of $W_2$ codewords exists and each $W_2$ codeword is used for selecting a two-dimensional beam $v_m \otimes u_n$ from $W_1$ and the co-phasing of different polarization directions, and the corresponding codeword index is $PMI_2$ represented by $i_2=1, \ldots, M_1$.

Without loss of generality, the codeword of the number $N_{11}=1$ of ports in the first dimension or the number $N_{12}=1$ of ports in the second dimension is the 1D codeword; and the codeword of the number $N_{11}>1$ of ports in the first dimension or the number $N_{12}>1$ of ports in the second dimension is the 2D codeword. The 1D codeword in a single codeword structure is represented by PMI or i, the 1D codeword in a dual codeword structure is jointly represented by $PMI_1$ and $PMI_2$ and the index is jointly represented by $i_1$ and $i_2$. the 2D codeword is jointly represented by three codebook indexes, $PMI_{11}$, $PMI_{12}$ and $PMI_2$, or jointly represented by indexes $i_{11}$, $i_{12}$ and $i_2$.

In the current system, the precoding matrix or the configured beam is fed back based on information of a strongest path in the channel and the information of other paths in the channel is ignored. In this way, the information which is fed back or configured cannot match the channel well, and the system performance is thus affected. Therefore, the LTE-A system introduces a codebook based on linear weighting and combination of information of multiple paths, thereby greatly improving feedback accuracy and the system performance.

Although the linear codebook based on combination of multiple paths can better match the channel, since the amplitude weighting coefficient and phase weighting coefficient of every piece of path information need to be fed back or configured in the combination process, the system will have a huge overhead.

SUMMARY

Embodiments of the present disclosure provide a channel information feedback method and apparatus, a terminal and a base station to reduce feedback overheads of a terminal in multi-path weighting or linear combination feedback.

An embodiment of the present disclosure provides a channel information feedback method. The method includes steps described below. A terminal determines a feedback state parameter of channel information. The channel information includes at least one of a number M of precoding vectors $v_1, v_2, \ldots, v_M$, a number G of amplitude coefficients $A_1, A_2, \ldots, A_G$, or a number K of phase coefficients $P_1, P_2, \ldots, P_K$, where M, G and K are all integers greater than or equal to 0. The terminal feeds back the channel information according to the determined feedback state parameter.

In an embodiment, the terminal determines the feedback state parameter in at least one of the manners described below.

The feedback state parameter is determined according to configuration signaling sent by a base station, where the configuration signaling includes at least one of higher-layer signaling or physical layer signaling.

The feedback state parameter is determined according to a physical channel for feeding back the channel information and/or a physical channel format of the physical channel for feeding back the channel information.

The feedback state parameter is determined according to the channel information obtained by measuring a channel.

The feedback state parameter is determined according to a number of antenna ports and/or a number of reference signal ports.

In an embodiment, when the terminal determines the feedback state parameter of the channel information according to the channel information obtained by measuring the channel, the terminal sends the determined feedback state parameter to the base station.

In an embodiment, the feedback state parameter includes at least a feedback mode. The feedback mode includes at least one of:

respective quantization and feedback of each of the precoding vectors, the amplitude coefficients and the phase coefficients; joint quantization and feedback of the precoding vectors and the amplitude coefficients; joint quantization and feedback of the precoding vectors and the phase coefficients; joint quantization and feedback of the amplitude coefficients and the phase coefficients; joint quantization and feedback of the precoding vectors, the amplitude coefficients and the phase coefficients; joint quantization and feedback of the amplitude coefficients and a channel quality indicator (CQI); joint quantization and feedback of the phase coefficients and the CQI; joint quantization and feedback of the amplitude coefficients and a rank indication (RI); respective quantization and feedback of amplitude coefficients at each transport layer; respective quantization and feedback of phase coefficients at the each transport layer; respective quantization and feedback of amplitude coefficients corresponding to each antenna port subset; or respective quantization and feedback of phase coefficients corresponding to the each antenna port subset.

In an embodiment, the feedback state parameter includes at least one of: a number of amplitude coefficient quantization states or a number of phase coefficient quantization states.

In an embodiment, the M precoding vectors are divided into a number L of groups, where precoding vectors in an I-th group have at least one of: a same number of amplitude coefficient quantization states or a same number of phase coefficient quantization states, where I is a positive integer, L is an integer greater than 1, and $1 \leq I \leq L$.

In an embodiment, the number of amplitude coefficient quantization states and/or the number of phase coefficient quantization states for each of the L groups are determined according to at least one of: a feedback mode of the channel information, configuration signaling from a base station, a physical channel for feeding back the channel information, or a physical channel format of the physical channel for feeding back the channel information.

In an embodiment, the number of amplitude coefficient quantization states for each amplitude coefficient $A_n$ is $g_n$ and the number of phase coefficient quantization states for each phase coefficient $P_k$ is $r_k$, where $n=1, 2, \ldots, G$ and $k=1, 2, \ldots, K$.

In an embodiment, numbers $g_1, g_2, \ldots, g_G$ of amplitude coefficient quantization states for the G amplitude coefficients $A_1, A_2, \ldots, A_G$ are a same integer or different integers, and numbers $r_1, r_2, \ldots, r_K$ of phase coefficient quantization states for the K phase coefficients $P_1, P_2, \ldots, P_K$ are a same integer or different integers.

In an embodiment, the feedback state parameter includes at least one of: whether to enable feedback of the G amplitude coefficients or whether to enable feedback of the K phase coefficients.

In an embodiment, the feedback state parameter further includes at least one of: enabling feedback of the G amplitude coefficients or not enabling feedback of the K phase coefficients.

In an embodiment, the feedback state parameter further includes: enabling feedback of the G amplitude coefficients and enabling feedback of the K phase coefficients.

In an embodiment, whether to enable feedback of the G amplitude coefficients and/or the K phase coefficients is determined according to at least one of: a feedback mode of the channel information, a physical channel for feeding back the channel information, or a physical channel format of the physical channel for feeding back the channel information.

In an embodiment, the feedback state parameter includes at least one of: a feedback period of the G amplitude coefficients, a feedback period of the K phase coefficients, or a relationship between the feedback period of the G amplitude coefficients and the feedback period of the K phase coefficients.

In an embodiment, the feedback period of the G amplitude coefficients is $T_1$, the feedback period of the K phase coefficients is $T_2$, and $T_1$ and $T_2$ satisfy a constraint relationship $T_1=c*T_2$, where c is positive integer.

In an embodiment, c is determined in at least one of the following manners: configuration of a base station and an agreement between the base station and the terminal.

In an embodiment, the feedback period $T_1$ of the G amplitude coefficients is b times a feedback period of an RI and the feedback period $T_2$ of the K phase coefficients is d times the feedback period of the RI, where b and d are both positive integers and b≥d.

In an embodiment, b and d each is determined in at least one of the following manners: configuration of a base station and an agreement between the base station and the terminal.

In an embodiment, the feedback state parameter includes: a number of precoding vectors fed back in the channel information.

In an embodiment, the number M of precoding vectors is determined according to a number R of reference signal ports of a base station, where R is a positive integer.

In an embodiment, when the number of reference signal ports is less than $R_0$, the number M of precoding vectors is 0 and the terminal feeds back a number N of amplitude coefficients and the K phase coefficients, where K and N are both integers greater than or equal to 0 and $R_0$ is a positive integer.

In an embodiment, the number of precoding vectors fed back by the terminal is determined according to at least one of: a feedback mode of the channel information, a physical channel for feeding back the channel information, or a physical channel format of the physical channel for feeding back the channel information.

In an embodiment, the feedback state parameter includes at least one of: a relationship between the amplitude coefficients in the channel information and an antenna port; a relationship between the amplitude coefficients in the channel information and a transport layer; a relationship between the phase coefficients in the channel information and the antenna port; or a relationship between the phase coefficients in the channel information and the transport layer.

In an embodiment, the antenna port includes a plurality of ports $T_0, T_1, \ldots, T_{B-1}$, where amplitude coefficients and/or phase coefficients associated with a port $T_0$ to a port $T_{B/2-1}$ are consistent with amplitude coefficients and/or phase coefficients associated with a port $T_{B/2}$ to a port $T_{B-1}$, where B is a positive integer.

In an embodiment, when the transport layer includes a number L of layers, different layers of the L layers have at least one same amplitude coefficient, where L is a positive integer.

In an embodiment, when the transport layer includes a number L of layers, different layers of the L layers have at least one same phase coefficient, where L is a positive integer.

Another embodiment of the present disclosure further provides a channel information feedback method. The method includes steps described below. A base station sends configuration signaling to a terminal. The configuration signaling is used for carrying a feedback state parameter of channel information and the channel information includes at least one of a number M of precoding vectors $v_1, v_2, \ldots, v_M$, a number G of amplitude coefficients $A_1, A_2, \ldots, A_G$, or a number K of phase coefficients $P_1, P_2, \ldots, P_K$, where M, G and K are all integers greater than or equal to 0. The base station receives the channel information fed back by the terminal according to the feedback state parameter.

In an embodiment, the configuration signaling includes at least one of higher-layer signaling or physical layer signaling.

In an embodiment, before the base station sends the configuration signaling to the terminal, the base station determines the feedback state parameter carried in the configuration signaling in at least one of the manners described below.

The feedback state parameter is determined according to a physical channel for feeding back the channel information and/or a physical channel format of the physical channel for feeding back the channel information.

The feedback state parameter is determined according to a feedback state parameter of the channel information reported by the terminal.

The feedback state parameter is determined according to a number of antenna ports and/or a number of reference signal ports.

In an embodiment, the feedback state parameter includes at least a feedback mode, and the feedback mode includes at least one of: respective quantization and feedback of each of the precoding vectors, the amplitude coefficients and the phase coefficients; joint quantization and feedback of the precoding vectors and the amplitude coefficients; joint quantization and feedback of the precoding vectors and the phase coefficients; joint quantization and feedback of the amplitude coefficients and the phase coefficients; joint quantization and feedback of the precoding vectors, the amplitude coefficients and the phase coefficients; joint quantization and feedback of the amplitude coefficients and a channel quality indicator (CQI); joint quantization and feedback of the phase coefficients and the CQI; joint quantization and feedback of the amplitude coefficients and a rank indication (RI); respective quantization and feedback of amplitude coefficients at each transport layer; respective quantization and feedback of phase coefficients at the each transport layer; respective quantization and feedback of amplitude coefficients corresponding to each antenna port subset; or respective quantization and feedback of phase coefficients corresponding to the each antenna port subset.

In an embodiment, the feedback mode is selected according to at least one of a physical channel for feeding back the channel information or a physical channel format of the physical channel for feeding back the channel information.

In an embodiment, the feedback state parameter includes at least one of: a number of amplitude coefficient quantization states or a number of phase coefficient quantization states.

In an embodiment, the M precoding vectors are divided into a number L of groups, where precoding vectors in an I-th group have at least one of: a same number of amplitude coefficient quantization states or a same number of phase coefficient quantization states, where I is a positive integer, L is an integer greater than 1, and 1≤I≤L.

In an embodiment, the base station configures the number of amplitude coefficient quantization states and/or the number of phase coefficient quantization states for each of the L groups via signaling.

In an embodiment, the number of amplitude coefficient quantization states for each amplitude coefficient $A_n$ is $g_n$ and the number of phase coefficient quantization states for each phase coefficient $P_k$ is $r_k$, where n=1, 2, . . . , G and k=1, 2, . . . , K.

In an embodiment, numbers $g_1, g_2, \ldots, g_G$ of amplitude coefficient quantization states for the G amplitude coefficients $A_1, A_2, \ldots, A_G$ are a same integer or different integers, and numbers $r_1, r_2, \ldots, r_K$ of phase coefficient quantization states for the K phase coefficients $P_1, P_2, \ldots, P_K$ are a same integer or different integers.

In an embodiment, the feedback state parameter includes at least one of: whether to enable feedback of the G amplitude coefficients or whether to enable feedback of the K phase coefficients.

In an embodiment, the feedback state parameter further includes at least one of: enabling feedback of the G amplitude coefficients or not enabling feedback of the K phase coefficients.

In an embodiment, the feedback state parameter further includes: enabling feedback of the G amplitude coefficients and enabling feedback of the K phase coefficients.

In an embodiment, whether to enable feedback of the G amplitude coefficients and/or the K phase coefficients is determined according to at least one of: a feedback mode of the channel information, a physical channel for feeding back the channel information, or a physical channel format of the physical channel for feeding back the channel information.

In an embodiment, the feedback state parameter includes at least one of: a feedback period of the G amplitude coefficients, a feedback period of the K phase coefficients, or a relationship between the feedback period of the G amplitude coefficients and the feedback period of the K phase coefficients.

In an embodiment, the feedback period of the G amplitude coefficients is $T_1$, the feedback period of the K phase coefficients is $T_2$, and $T_1$ and $T_2$ satisfy a constraint relationship $T_1 = c*T_2$, where c is positive integer.

In an embodiment, c is determined in at least one of the following manners: configuration of a base station and an agreement between the base station and the terminal.

In an embodiment, the feedback period $T_1$ of the G amplitude coefficients is b times a feedback period of an RI and the feedback period $T_2$ of the K phase coefficients is d times the feedback period of the RI, where b and d are both positive integers and b≥d.

In an embodiment, b and d each is determined in at least one of the following manners: configuration of a base station and an agreement between the base station and the terminal.

In an embodiment, the feedback state parameter includes: a number of precoding vectors fed back in the channel information.

In an embodiment, the number M of precoding vectors is determined according to a number R of reference signal ports of the base station, where R is a positive integer.

In an embodiment, when the number of the reference signal ports is less than $R_0$, the number M of precoding vectors is 0 and the terminal feeds back a number N of amplitude coefficients and the K phase coefficients, where K and N are both integers greater than or equal to 0 and $R_0$ is a positive integer.

In an embodiment, the number of precoding vectors fed back by the terminal is determined according to at least one of: a feedback mode of the channel information, a physical channel for feeding back the channel information, or a physical channel format of the physical channel for feeding back the channel information.

In an embodiment, the feedback state parameter includes at least one of: a relationship between the amplitude coefficients in the channel information and an antenna port; a relationship between the amplitude coefficients in the channel information and a transport layer; a relationship between the phase coefficients in the channel information and the antenna port; or a relationship between the phase coefficients in the channel information and the transport layer.

In an embodiment, the antenna port includes a plurality of ports $T_0, T_1, \ldots, T_{B-1}$, where amplitude coefficients and/or phase coefficients associated with a port $T_0$ to a port $T_{B/2-1}$ are consistent with amplitude coefficients and/or phase coefficients associated with a port $T_{B/2}$ to a port $T_{B-1}$, where B is a positive integer.

In an embodiment, when the transport layer includes a number L of layers, different layers of the L layers have at least one same amplitude coefficient, where L is a positive integer.

In an embodiment, when the transport layer includes a number L of layers, different layers of the L layers have at least one same phase coefficient, where L is a positive integer.

Another embodiment of the present disclosure further provides a channel information feedback apparatus, applied to a terminal. The apparatus includes a first determination module and a first sending module. The first determination module is configured to determine a feedback state parameter of channel information. The channel information includes at least one of a number M of precoding vectors $v_1, v_2, \ldots, v_M$, a number G of amplitude coefficients $A_1, A_2, \ldots, A_G$, or a number K of phase coefficients $P_1, P_2, \ldots, P_K$, where M, G and K are all integers greater than or equal to 0. The first sending module is configured to feed back the channel information according to the determined feedback state parameter.

In an embodiment, the feedback state parameter includes at least a feedback mode. The feedback mode includes at least one of: respective quantization and feedback of each of the precoding vectors, the amplitude coefficients and the phase coefficients; joint quantization and feedback of the precoding vectors and the amplitude coefficients; joint quantization and feedback of the precoding vectors and the phase coefficients; joint quantization and feedback of the amplitude coefficients and the phase coefficients; joint quantization and feedback of the precoding vectors, the amplitude coefficients and the phase coefficients; joint quantization and feedback of the amplitude coefficients and a channel quality indicator (CQI); joint quantization and feedback of the phase coefficients and the CQI; joint quantization and feedback of the amplitude coefficients and a rank indication (RI); respective quantization and feedback of amplitude coefficients at each transport layer; respective quantization and feedback of phase coefficients at the each transport layer; respective quantization and feedback of amplitude coefficients corresponding to each antenna port subset; or respective quantization and feedback of phase coefficients corresponding to the each antenna port subset.

In an embodiment, the feedback state parameter includes at least one of: a number of amplitude coefficient quantization states or a number of phase coefficient quantization states.

In an embodiment, the feedback state parameter includes at least one of: whether to enable feedback of the G amplitude coefficients or whether to enable feedback of the K phase coefficients.

In an embodiment, the feedback state parameter includes at least one of: a feedback period of the G amplitude coefficients, a feedback period of the K phase coefficients, or a relationship between the feedback period of the G amplitude coefficients and the feedback period of the K phase coefficients.

In an embodiment, the feedback state parameter includes: a number of precoding vectors fed back in the channel information.

In an embodiment, the feedback state parameter includes at least one of: a relationship between the amplitude coefficients in the channel information and an antenna port; a relationship between the amplitude coefficients in the channel information and a transport layer; a relationship between the phase coefficients in the channel information and the antenna port; or a relationship between the phase coefficients in the channel information and the transport layer.

In an embodiment, the first determination module is further configured to determine the feedback state parameter of the channel information in at least one of the manners described below.

The feedback state parameter is determined according to the configuration signaling including higher-layer signaling and/or physical layer signaling and sent by a base station.

The feedback state parameter is determined according to a physical channel for feeding back the channel information and/or a physical channel format of the physical channel for feeding back the channel information.

The feedback state parameter is determined according to the channel information obtained by measuring a channel.

The feedback state parameter is determined according to a number of antenna ports and/or a number of reference signal ports.

Another embodiment of the present disclosure further provides a channel information feedback apparatus, applied to a base station. The apparatus includes a second sending module and a receiving module.

The second sending module is configured to send configuration signaling to a terminal. The configuration signaling is used for carrying a feedback state parameter of channel information and the channel information includes at least one of a number M of precoding vectors $v_1, v_2, \ldots, v_M$, a number G of amplitude coefficients $A_1, A_2, \ldots, A_G$, or a number K of phase coefficients $P_1, P_2, \ldots, P_K$, wherein M, G and K are all integers greater than or equal to 0.

The receiving module is configured to receive the channel information fed back by the terminal according to the feedback state parameter.

In an embodiment, the feedback state parameter includes at least a feedback mode, and the feedback mode includes at least one of: respective quantization and feedback of each of the precoding vectors, the amplitude coefficients and the phase coefficients; joint quantization and feedback of the precoding vectors and the amplitude coefficients; joint quantization and feedback of the precoding vectors and the phase coefficients; joint quantization and feedback of the amplitude coefficients and the phase coefficients; joint quantization and feedback of the precoding vectors, the amplitude coefficients and the phase coefficients; joint quantization and feedback of the amplitude coefficients and a channel quality indicator (CQI); joint quantization and feedback of the phase coefficients and the CQI; joint quantization and feedback of the amplitude coefficients and a rank indication (RI); respective quantization and feedback of amplitude coefficients at each transport layer; respective quantization and feedback of phase coefficients at the each transport layer; respective quantization and feedback of amplitude coefficients corresponding to each antenna port subset; or respective quantization and feedback of phase coefficients corresponding to the each antenna port subset.

In an embodiment, the feedback state parameter includes at least one of: a number of amplitude coefficient quantization states or a number of phase coefficient quantization states.

In an embodiment, the feedback state parameter includes at least one of: whether to enable feedback of the G amplitude coefficients or whether to enable feedback of the K phase coefficients.

In an embodiment, the feedback state parameter includes at least one of: a feedback period of the G amplitude coefficients, a feedback period of the K phase coefficients, or a relationship between the feedback period of the G amplitude coefficients and the feedback period of the K phase coefficients.

In an embodiment, the feedback state parameter includes: a number of precoding vectors fed back in the channel information.

In an embodiment, the feedback state parameter includes at least one of: a relationship between the amplitude coefficients in the channel information and an antenna port; a relationship between the amplitude coefficients in the channel information and a transport layer; a relationship between the phase coefficients in the channel information and the antenna port; or a relationship between the phase coefficients in the channel information and the transport layer.

In an embodiment, the apparatus further includes a second determination module. The second determination module is configured to determine the feedback state parameter of the channel information in at least one of the manners described below.

The feedback state parameter is determined according to a physical channel for feeding back the channel information and/or a physical channel format of the physical channel for feeding back the channel information.

The feedback state parameter is determined according to a feedback state parameter of the channel information reported by the terminal.

The feedback state parameter is determined according to a number of antenna ports and/or a number of reference signal ports.

Another embodiment of the present disclosure further provides a terminal. The terminal includes: a first processor; and a first memory, which is configured to store instructions executable by the first processor. The first processor is configured to perform, according to the instructions stored in the first memory, the operations described below.

A feedback state parameter of channel information is determined. The channel information includes at least one of a number M of precoding vectors $v_1, v_2, \ldots, v_M$, a number G of amplitude coefficients $A_1, A_2, \ldots, A_G$, or a number K of phase coefficients $P_1, P_2, \ldots, P_K$, where M, G and K are all integers greater than or equal to 0.

The channel information is fed back according to the determined feedback state parameter.

In an embodiment, the feedback state parameter includes at least a feedback mode. The feedback mode includes at least one of: respective quantization and feedback of each of the precoding vectors, the amplitude coefficients and the phase coefficients; joint quantization and feedback of the precoding vectors and the amplitude coefficients; joint quantization and feedback of the precoding vectors and the phase coefficients; joint quantization and feedback of the amplitude coefficients and the phase coefficients; joint quantization and feedback of the precoding vectors, the amplitude coefficients and the phase coefficients; joint quantization and feedback of the amplitude coefficients and a channel quality indicator (CQI); joint quantization and feedback of the phase coefficients and the CQI; joint quantization and feedback of the amplitude coefficients and a rank indication (RI); respective quantization and feedback of amplitude coefficients at each transport layer; respective quantization and feedback of phase coefficients at the each transport layer; respective quantization and feedback of amplitude coefficients corresponding to each antenna port subset; or respective quantization and feedback of phase coefficients corresponding to the each antenna port subset.

In an embodiment, the feedback state parameter includes at least one of: a number of amplitude coefficient quantization states or a number of phase coefficient quantization states.

In an embodiment, the feedback state parameter includes at least one of: whether to enable feedback of the G amplitude coefficients or whether to enable feedback of the K phase coefficients.

Another embodiment of the present disclosure further provides a base station. The base station includes a second processor; and a second memory, which is configured to store instructions executable by the second processor. The second processor is configured to perform, according to the instructions stored in the second memory, the operations described below.

Configuration signaling is sent to a terminal. The configuration signaling is used for carrying a feedback state parameter of channel information and the channel information includes at least one of a number M of precoding vectors $v_1, v_2, \ldots, v_M$, a number G of amplitude coefficients $A_1, A_2, \ldots, A_G$, or a number K of phase coefficients $P_1, P_2, \ldots, P_K$, where M, G and K are all integers greater than or equal to 0.

The channel information fed back by the terminal according to the feedback state parameter is received.

In an embodiment, the feedback state parameter includes at least a feedback mode. The feedback mode includes at least one of: respective quantization and feedback of each of the precoding vectors, the amplitude coefficients and the phase coefficients; joint quantization and feedback of the precoding vectors and the amplitude coefficients; joint quantization and feedback of the precoding vectors and the phase coefficients; joint quantization and feedback of the amplitude coefficients and the phase coefficients; joint quantization and feedback of the precoding vectors, the amplitude coefficients and the phase coefficients; joint quantization and feedback of the amplitude coefficients and a channel quality indicator (CQI); joint quantization and feedback of the phase coefficients and the CQI; joint quantization and feedback of the amplitude coefficients and a rank indication (RI); respective quantization and feedback of amplitude coefficients at each transport layer; respective quantization and feedback of phase coefficients at the each transport layer; respective quantization and feedback of amplitude coefficients corresponding to each antenna port subset; or respective quantization and feedback of phase coefficients corresponding to the each antenna port subset.

In an embodiment, the feedback state parameter includes at least one of: a number of amplitude coefficient quantization states or a number of phase coefficient quantization states.

In an embodiment, the feedback state parameter includes at least one of: whether to enable feedback of the G amplitude coefficients or whether to enable feedback of the K phase coefficients.

Another embodiment of the present disclosure further provides a channel information feedback system. The system includes a base station and at least one terminal. The base station is configured to send configuration signaling to the at least one terminal, where the configuration signaling is used for carrying a feedback state parameter of channel information and the channel information includes at least one of a number M of precoding vectors $v_1, v_2, \ldots, v_M$, a number G of amplitude coefficients $A_1, A_2, \ldots, A_G$, or a number K of phase coefficients $P_1, P_2, \ldots, P_K$, where M, G and K are all integers greater than or equal to 0.

The at least one terminal is configured to receive the configuration signaling sent by the base station and feed back the channel information to the base station according to the feedback state parameter of the channel information carried in the configuration signaling.

In an embodiment, the feedback state parameter includes at least a feedback mode. The feedback mode includes at least one of: respective quantization and feedback of each of the precoding vectors, the amplitude coefficients and the phase coefficients; joint quantization and feedback of the precoding vectors and the amplitude coefficients; joint quantization and feedback of the precoding vectors and the phase coefficients; joint quantization and feedback of the amplitude coefficients and the phase coefficients; joint quantization and feedback of the precoding vectors, the amplitude coefficients and the phase coefficients; joint quantization and feedback of the amplitude coefficients and a channel quality indicator (CQI); joint quantization and feedback of the phase coefficients and the CQI; joint quantization and feedback of the amplitude coefficients and a rank indication (RI); respective quantization and feedback of amplitude coefficients at each transport layer; respective quantization and feedback of phase coefficients at the each transport layer; respective quantization and feedback of amplitude coefficients corresponding to each antenna port subset; or respective quantization and feedback of phase coefficients corresponding to the each antenna port subset.

In an embodiment, the feedback state parameter includes at least one of: a number of amplitude coefficient quantization states or a number of phase coefficient quantization states.

An embodiment of the present disclosure further provides a computer storage medium, which is configured to store executable instructions for executing the channel information feedback method in the embodiments described above.

In the embodiments of the present disclosure, the terminal determines the feedback state parameter of the channel information, where the channel information includes at least one of the M precoding vectors $v_1, v_2, \ldots, v_M$, the G amplitude coefficients $A_1, A_2, \ldots, A_G$, or the K phase coefficients $P_1, P_2, \ldots, P_K$, where M, G and K are all integers greater than or equal to 0; and the terminal feeds back the channel information according to the determined feedback state parameter. This reduces feedback overheads of the terminal in multi-path weighting or linear combination feedback so that the terminal may perform more targeted channel information feedback, reducing pilot overheads, improving feedback efficiency, and saving resources.

BRIEF DESCRIPTION OF DRAWINGS

The drawings described herein are used to provide a further understanding of the present disclosure and form a part of the present application. The exemplary embodiments and descriptions thereof in the present disclosure are used to explain the present disclosure and not to limit the present disclosure in any improper way. In the drawings:

FIG. 1 is a block diagram of hardware of a computer terminal for a channel information feedback method according to an embodiment of the present disclosure;

FIG. 2 is a flowchart 1 of a channel information feedback method according to an embodiment 1 of the present disclosure;

DETAILED DESCRIPTION

Figure 3:
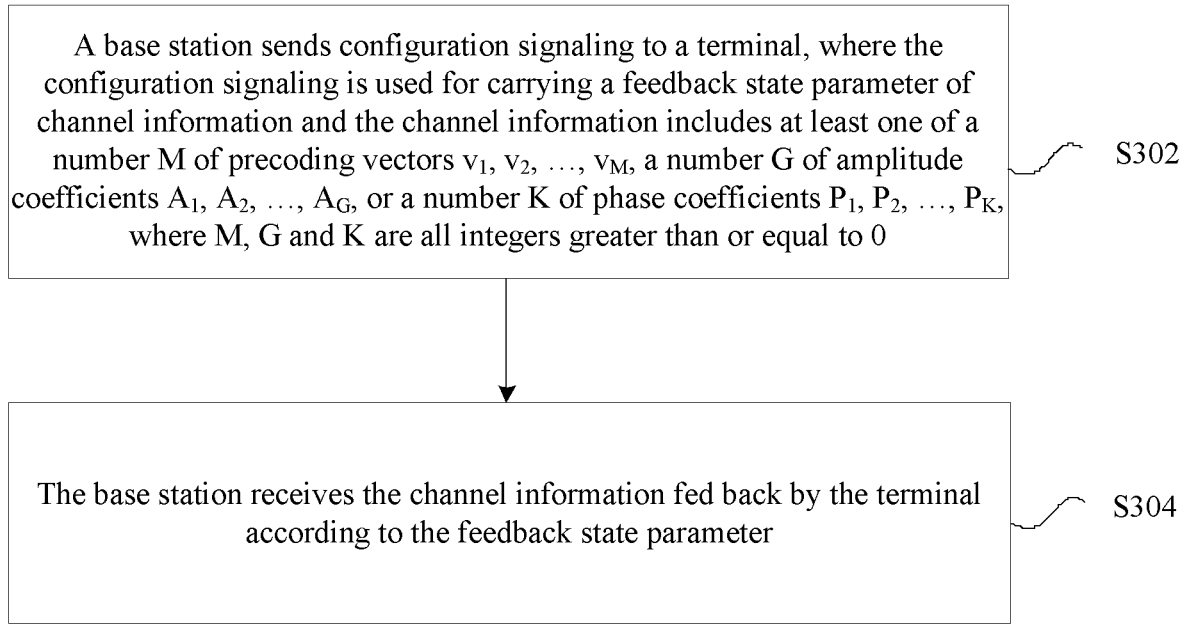
FIG. 3 is a flowchart 2 of a channel information feedback method according to the embodiment 1 of the present disclosure.

The present disclosure will be described hereinafter in detail with reference to the drawings in conjunction with the embodiments. It is to be noted that if not in collision, the embodiments and features therein in the present application may be combined with each other.

It is to be noted that the terms "first", "second" and the like in the description, claims and drawings of the present disclosure are used to distinguish between similar objects and are not necessarily used to describe a particular order or sequence. It should be understood that the data used in this way is interchangeable where appropriate so that the embodiments of the present disclosure described herein may also be implemented in a sequence not illustrated or described herein. In addition, the terms "including", "having" or any other variations thereof described herein are intended to encompass a non-exclusive inclusion. For example, a process, method, system, product or device that includes a series of steps or units may include not only the expressly listed steps or units but also other steps or units that are not expressly listed or are inherent to such a process, method, system, product or device.

Embodiment 1

An embodiment of the present disclosure provides a channel information feedback method. It is to be noted that the steps illustrated in the flowcharts in the drawings may be performed by a computer system such as a group of computers capable of executing instructions. Although logical sequences are illustrated in the flowcharts, the illustrated or described steps may be executed in sequences different from those described herein in some cases.

The method embodiment provided by the embodiment 1 of the present application may be executed on a mobile terminal, a computer terminal or other similar computing apparatuses. Taking the method embodiment executed on the computer terminal as an example, FIG. 1 is a block diagram of hardware of a computer terminal for a channel information feedback method according to an embodiment of the present disclosure. As shown in FIG. 1, a computer terminal 10 may include one or more (only one is shown in FIG. 1) processors 102 (the processors 102 may include, but are not limited to, a processing device such as a microcontroller unit (MCU) and a field programmable gate array (FPGA)), a memory 104 for storing data and a transmission apparatus 106 for implementing a communication function. It should be understood by those skilled in the art that the structure shown in FIG. 1 is merely illustrative and not intended to limit the structure of the electronic apparatus described above. For example, the computer terminal 10 may further include more or fewer components than the components shown in FIG. 1, or has a configuration different from the configuration shown in FIG. 1.

The memory 104 may be configured to store software programs and modules of application software, such as program instructions/modules corresponding to the channel information feedback method in the embodiment of the present disclosure. The processor 102 executes the software programs and modules stored in the memory 104 so as to perform various function applications and data processing, that is, to implement a vulnerability detection method of application programs described above. The memory 104 may include a high-speed random access memory, and may further include a nonvolatile memory, such as one or more magnetic storage apparatuses, flash memories or other non-volatile solid-state memories. In some examples, the memory 104 may further include memories that are remotely disposed with respect to the processor 102. These remote memories may be connected to the computer terminal 10 via a network. Examples of the preceding network include, but are not limited to, the Internet, an intranet, a local area network, a mobile communication network and a combination thereof.

The transmission apparatus 106 is configured to receive and transmit data via a network. Specific examples of the preceding network may include a wireless network provided by a communication provider of the computer terminal 10. In one example, the transmission apparatus 106 includes a network interface controller (NIC), which may be connected to other network devices via the base station and thus be capable of communicating with the Internet. In one example, the transmission apparatus 106 may be a radio frequency (RF) module, which is used for communicating with the Internet in a wireless way.

In the preceding operating environment, the present application provides a channel information feedback method shown in FIG. 2. FIG. 2 is a flowchart 1 of a channel information feedback method according to an embodiment 1 of the present disclosure. As shown in FIG. 2, the method includes steps described below.

In step S202, a terminal determines a feedback state parameter of channel information. The channel information includes at least one of a number M of precoding vectors $v_1$, $v_2, \ldots, v_M$, a number G of amplitude coefficients $A_1$, $A_2, \ldots, A_G$, or a number K of phase coefficients $P_1$, $P_2, \ldots, P_K$, where M, G and K are all integers greater than or equal to 0.

In step S204, the terminal feeds back the channel information according to the determined feedback state parameter.

In the above steps, the terminal determines the feedback state parameter of the channel information and the terminal feeds back the channel information according to the determined feedback state parameter. The channel information includes at least one of the M precoding vectors $v_1$, $v_2, \ldots, v_M$, the G amplitude coefficients $A_1, A_2, \ldots, A_G$, or the K phase coefficients $P_1, P_2, \ldots, P_K$, where M, G and K are all integers greater than or equal to 0. This reduces feedback overheads of a terminal in multi-path weighting or linear combination feedback so that the terminal may perform more targeted channel information feedback, reducing pilot overheads, improving feedback efficiency, and saving resources.

In an embodiment, the terminal determines the feedback state parameter in at least one of the manners described below.

The feedback state parameter is determined according to configuration signaling sent by a base station, where the configuration signaling includes at least one of higher-layer signaling or physical layer signaling. The feedback state parameter is determined according to a physical channel for feeding back the channel information and/or a physical channel format of the physical channel for feeding back the channel information. The feedback state parameter is determined according to the channel information obtained by measuring a channel. The feedback state parameter is determined according to a number of antenna ports and/or a number of reference signal ports.

In an embodiment, when the terminal determines the feedback state parameter of the channel information according to the channel information obtained by measuring the channel, the terminal sends the determined feedback state parameter to the base station.

In an embodiment, the feedback state parameter includes at least a feedback mode, and the feedback mode includes at least one of: respective quantization and feedback of each of the precoding vectors, the amplitude coefficients and the phase coefficients; joint quantization and feedback of the precoding vectors and the amplitude coefficients; joint quantization and feedback of the precoding vectors and the phase coefficients; joint quantization and feedback of the amplitude coefficients and the phase coefficients; joint quantization and feedback of the precoding vectors, the amplitude coefficients and the phase coefficients; joint quantization and feedback of the amplitude coefficients and a CQI; joint quantization and feedback of the phase coefficients and the CQI; joint quantization and feedback of the amplitude coefficients and an RI; respective quantization and feedback of amplitude coefficients at each transport layer; respective quantization and feedback of phase coefficients at the each transport layer; respective quantization and feedback of amplitude coefficients corresponding to each antenna port subset; or respective quantization and feedback of phase coefficients corresponding to the each antenna port subset.

In an embodiment, the feedback state parameter includes at least one of: a number of amplitude coefficient quantization states or a number of phase coefficient quantization states.

In an embodiment, the M precoding vectors are divided into a number L of groups, where precoding vectors in an I-th group have at least one of: a same number of amplitude coefficient quantization states or a same number of phase coefficient quantization states, where I and L are positive integers and $1 \leq I \leq L$.

In an embodiment, the number of amplitude coefficient quantization states and/or the number of phase coefficient quantization states for each of the L groups are determined according to at least one of: the feedback mode of the channel information, the configuration signaling from the base station, the physical channel for feeding back the channel information, or the physical channel format of the physical channel for feeding back the channel information.

In an embodiment, the number of amplitude coefficient quantization states is $g_n$ and the number of phase coefficient quantization states is $r_k$, where n=1, 2, . . . , G and k=1, 2, . . . , K.

In an embodiment, numbers $g_1, g_2, \ldots, g_G$ of amplitude coefficient quantization states are a same integer or different integers, and numbers $r_1, r_2, \ldots, r_K$ of phase coefficient quantization states are a same integer or different integers.

In an embodiment, the feedback state parameter includes at least one of: whether to enable feedback of the G amplitude coefficients or whether to enable feedback of the K phase coefficients.

In an embodiment, the feedback state parameter further includes at least one of: enabling feedback of the G amplitude coefficients or not enabling feedback of the K phase coefficients.

In an embodiment, the feedback state parameter further includes enabling feedback of the G amplitude coefficients and enabling feedback of the K phase coefficients.

In an embodiment, whether to enable feedback of the G amplitude coefficients and/or the K phase coefficients is determined according to at least one of: the feedback mode of the channel information, the physical channel for feeding back the channel information, or the physical channel format of the physical channel for feeding back the channel information.

In an embodiment, the feedback state parameter includes at least one of: a feedback period of the G amplitude coefficients, a feedback period of the K phase coefficients, or a relationship between the feedback period of the G amplitude coefficients and the feedback period of the K phase coefficients.

In an embodiment, the feedback period of the G amplitude coefficients is $T_1$, the feedback period of the K phase coefficients is $T_2$, and $T_1$ and $T_2$ satisfy a constraint relationship $T_1=c*T_2$, where c is positive integer.

In an embodiment, c is determined in at least one of the following manners: configuration of the base station and an agreement between the base station and the terminal.

In an embodiment, the feedback period $T_1$ of the G amplitude coefficients is b times a feedback period of the RI and the feedback period $T_2$ of the K phase coefficients is d times the feedback period of the RI, where b and d are both positive integers and $b \geq d$.

In an embodiment, b and d are determined in at least one of the following manners: the configuration of the base station and the agreement between the base station and the terminal.

In an embodiment, the feedback state parameter includes: a number of precoding vectors fed back in the channel information.

In an embodiment, the number M of precoding vectors is determined according to a number R of reference signal ports of the base station, where R is a positive integer.

In an embodiment, when the number of reference signal ports is less than $R_0$, the number M of precoding vectors is 0 and the terminal feeds back a number N of amplitude coefficients and the K phase coefficients, where K and N are both integers greater than or equal to 0 and $R_0$ is a positive integer.

In an embodiment, the number of precoding vectors fed back by the terminal is determined according to at least one of: the feedback mode of the channel information, the physical channel for feeding back the channel information, or the physical channel format of the physical channel for feeding back the channel information.

In an embodiment, the feedback state parameter includes at least one of: a relationship between the amplitude coefficients in the channel information and an antenna port; a relationship between the amplitude coefficients in the channel information and a transport layer; a relationship between the phase coefficients in the channel information and the antenna port; or a relationship between the phase coefficients in the channel information and the transport layer.

In an embodiment, the antenna port includes a plurality of ports $T_0, T_1, \ldots, T_{B-1}$, where amplitude coefficients and/or phase coefficients associated with a port $T_0$ to a port $T_{B/2-1}$ are consistent with amplitude coefficients and/or phase coefficients associated with a port $T_{B/2}$ to a port $T_{B-1}$, where B is a positive integer.

In an embodiment, when the transport layer includes a number L of layers, different layers of the L layers have at least one same amplitude coefficient, where L is a positive integer.

In an embodiment, when the transport layer includes the number L of layers, different layers of the L layers have at least one same phase coefficient, where L is a positive integer.

For a better understanding of the above embodiment, this embodiment further provides a channel information feedback method. FIG. 3 is a flowchart 2 of a channel information feedback method according to the embodiment 1 of the present disclosure. As shown in FIG. 3, the method includes steps described below.

In step S302, a base station sends configuration signaling to a terminal, where the configuration signaling is used for carrying a feedback state parameter of channel information and the channel information includes at least one of a number M of precoding vectors $v_1, v_2, \ldots, v_M$, a number G of amplitude coefficients $A_1, A_2, \ldots, A_G$, or a number K of phase coefficients $P_1, P_2, \ldots, P_K$, where M, G and K are all integers greater than or equal to 0.

In step S304, the base station receives the channel information fed back by the terminal according to the feedback state parameter.

In the above steps, the base station sends the configuration signaling to the terminal and receives the channel information fed back by the terminal according to the feedback state parameter. The configuration signaling is used for carrying the feedback state parameter of the channel information and the channel information includes at least one of the M precoding vectors $v_1, v_2, \ldots, v_M$, the G amplitude coefficients $A_1, A_2, \ldots, A_G$, or the K phase coefficients $P_1, P_2, \ldots, P_K$, where M, G and K are all integers greater than or equal to 0. This reduces feedback overheads of a terminal in multi-path weighting or linear combination feedback so that the terminal may perform more targeted channel information feedback, reducing pilot overheads, improving feedback efficiency, and saving resources.

In an embodiment, the configuration signaling includes at least one of higher-layer signaling or physical layer signaling.

In an embodiment, before the base station sends the configuration signaling to the terminal, the base station determines the feedback state parameter carried in the configuration signaling in at least one of the manners described below.

The feedback state parameter is determined according to a physical channel for feeding back the channel information and/or a physical channel format of the physical channel for feeding back the channel information.

The feedback state parameter is determined according to a feedback state parameter of the channel information reported by the terminal.

The feedback state parameter is determined according to a number of antenna ports and/or a number of reference signal ports.

In an embodiment, the feedback state parameter includes at least a feedback mode, and the feedback mode includes at least one of: respective quantization and feedback of each of the precoding vectors, the amplitude coefficients and the phase coefficients; joint quantization and feedback of the precoding vectors and the amplitude coefficients; joint quantization and feedback of the precoding vectors and the phase coefficients; joint quantization and feedback of the amplitude coefficients and the phase coefficients; joint quantization and feedback of the precoding vectors, the amplitude coefficients and the phase coefficients; joint quantization and feedback of the amplitude coefficients and a CQI; joint quantization and feedback of the phase coefficients and the CQI; joint quantization and feedback of the amplitude coefficients and an RI; respective quantization and feedback of amplitude coefficients at each transport layer; respective quantization and feedback of phase coefficients at the each transport layer; respective quantization and feedback of amplitude coefficients corresponding to each antenna port subset; or respective quantization and feedback of phase coefficients corresponding to the each antenna port subset.

In an embodiment, the feedback mode is selected according to at least one of the physical channel for feeding back the channel information or the physical channel format of the physical channel for feeding back the channel information.

In an embodiment, the feedback state parameter includes at least one of: a number of amplitude coefficient quantization states or a number of phase coefficient quantization states.

In an embodiment, the M precoding vectors are divided into a number L of groups, where precoding vectors in an I-th group have at least one of: a same number of amplitude coefficient quantization states or a same number of phase coefficient quantization states, where I and L are positive integers and $1 \le I \le L$.

In an embodiment, the base station configures the number of amplitude coefficient quantization states and/or the number of phase coefficient quantization states for each of the L groups via signaling.

In an embodiment, the number of amplitude coefficient quantization states is $g_n$, and the number of phase coefficient quantization states is $r_k$, where $n=1, 2, \ldots, G$ and $k=1, 2, \ldots, K$.

In an embodiment, numbers $g_1, g_2, \ldots, g_G$ of amplitude coefficient quantization states are a same integer or different integers, and numbers $r_1, r_2, \ldots, r_K$ of phase coefficient quantization states are a same integer or different integers.

In an embodiment, the feedback state parameter includes at least one of: whether to enable feedback of the G amplitude coefficients or whether to enable feedback of the K phase coefficients.

In an embodiment, the feedback state parameter further includes at least one of: enabling feedback of the G amplitude coefficients or not enabling feedback of the K phase coefficients.

In an embodiment, the feedback state parameter further includes enabling feedback of the G amplitude coefficients and enabling feedback of the K phase coefficients.

In an embodiment, whether to enable feedback of the G amplitude coefficients and/or the K phase coefficients is determined according to at least one of: the feedback mode of the channel information, the physical channel for feeding back the channel information, or the physical channel format of the physical channel for feeding back the channel information.

In an embodiment, the feedback state parameter includes at least one of: a feedback period of the G amplitude coefficients, a feedback period of the K phase coefficients, or a relationship between the feedback period of the G amplitude coefficients and the feedback period of the K phase coefficients.

In an embodiment, the feedback period of the G amplitude coefficients is $T_1$, the feedback period of the K phase coefficients is $T_2$, and $T_1$ and $T_2$ satisfy a constraint relationship $T_1=c*T_2$, where c is positive integer.

In an embodiment, c is determined in at least one of the following manners: configuration of the base station and an agreement between the base station and the terminal.

In an embodiment, the feedback period $T_1$ of the G amplitude coefficients is b times a feedback period of the RI and the feedback period $T_2$ of the K phase coefficients is d times the feedback period of the RI, where b and d are both positive integers and b≥d.

In an embodiment, b and d are determined in at least one of the following manners: the configuration of the base station and the agreement between the base station and the terminal.

In an embodiment, the feedback state parameter includes: a number of precoding vectors fed back in the channel information.

In an embodiment, the number M of precoding vectors is determined according to a number R of reference signal ports of the base station, where R is a positive integer.

In an embodiment, when the number of reference signal ports is less than $R_0$, the number M of precoding vectors is 0 and the terminal feeds back a number N of amplitude coefficients and the K phase coefficients, where K and N are both integers greater than or equal to 0 and $R_0$ is a positive integer.

In an embodiment, the number of precoding vectors fed back by the terminal is determined according to at least one of: the feedback mode of the channel information, the physical channel for feeding back the channel information, or the physical channel format of the physical channel for feeding back the channel information.

In an embodiment, the feedback state parameter includes at least one of: a relationship between the amplitude coefficients in the channel information and an antenna port; a relationship between the amplitude coefficients in the channel information and a transport layer; a relationship between the phase coefficients in the channel information and the antenna port; or a relationship between the phase coefficients in the channel information and the transport layer.

In an embodiment, the antenna port includes a plurality of ports $T_0, T_1, \ldots, T_{B-1}$, where amplitude coefficients and/or phase coefficients associated with a port $T_0$ to a port $T_{B/2-1}$ are consistent with amplitude coefficients and/or phase coefficients associated with a port $T_{B/2}$ to a port $T_{B-1}$, where B is a positive integer.

In an embodiment, when the transport layer includes a number L of layers, different layers of the L layers have at least one same amplitude coefficient, where L is a positive integer.

In an embodiment, when the transport layer includes the number L of layers, different layers of the L layers have at least one same phase coefficient, where L is a positive integer.

From the description of the embodiment described above, it will be apparent to those skilled in the art that the methods in the embodiment described above may be implemented by software plus a necessary general-purpose hardware platform, or may of course be implemented by hardware. However, in many cases, the former is a preferred implementation mode. Based on this understanding, the present disclosure substantially, or the part contributing to the existing art, may be embodied in the form of a software product. The computer software product is stored in a storage medium (such as a read-only memory (ROM)/random access memory (RAM), a magnetic disk or an optical disk) and includes several instructions for enabling a terminal device (which may be a mobile phone, a computer, a server, a network device, etc.) to execute the method according to each embodiment of the present disclosure.

Embodiment 2

This embodiment provides a channel information feedback apparatus. The apparatus is used for implementing the method embodiment and preferred examples described above on a terminal side. What has been described will not be repeated. As used below, the term "module" may be software, hardware or a combination thereof capable of implementing predetermined functions. The apparatus in the embodiment described below is In an embodiment implemented by software, but implementation by hardware or by a combination of software and hardware is also possible and conceived.

Figure 4:
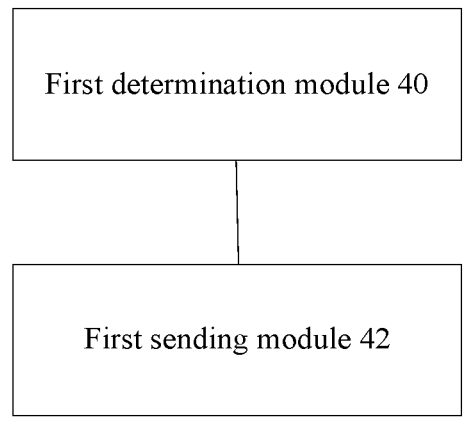
FIG. 4 a block diagram 1 of a channel information feedback apparatus according to an embodiment 2 of the present disclosure.

FIG. 4 a block diagram 1 of a channel information feedback apparatus according to an embodiment 2 of the present disclosure. As shown in FIG. 4, the apparatus is applied to a terminal and includes a first determination module 40 and a first sending module 42.

The first determination module 40 is configured to determine a feedback state parameter of channel information. The channel information includes at least one of a number M of precoding vectors $v_1, v_2, \ldots, v_M$, a number G of amplitude coefficients $A_1, A_2, \ldots, A_G$, or a number K of phase coefficients $P_1, P_2, \ldots, P_K$, where M, G and K are all integers greater than or equal to 0.

The first sending module 42 is configured to feed back the channel information according to the determined feedback state parameter.

In the above apparatus, the first determination module 40 determines the feedback state parameter of the channel information and the first sending module 42 feeds back the channel information according to the determined feedback state parameter. The channel information includes at least one of the M precoding vectors $v_1, v_2, \ldots, v_M$, the G amplitude coefficients $A_1, A_2, \ldots, A_G$, or the K phase coefficients $P_1, P_2, \ldots, P_K$, where M, G and K are all integers greater than or equal to 0. This reduces feedback overheads of a terminal in a multi-path weighting or linear combination feedback system so that the terminal may perform more targeted channel information feedback, reducing pilot overheads, improving feedback efficiency, and saving resources.

In an embodiment, the feedback state parameter includes at least a feedback mode, and the feedback mode includes at least one of: respective quantization and feedback of each of the precoding vectors, the amplitude coefficients and the phase coefficients; joint quantization and feedback of the precoding vectors and the amplitude coefficients; joint quantization and feedback of the precoding vectors and the phase coefficients; joint quantization and feedback of the amplitude coefficients and the phase coefficients; joint quantization and feedback of the precoding vectors, the amplitude coefficients and the phase coefficients; joint quantization and feedback of the amplitude coefficients and a CQI; joint quantization and feedback of the phase coefficients and the CQI; joint quantization and feedback of the amplitude coefficients and an RI; respective quantization and feedback of amplitude coefficients at each transport layer; respective quantization and feedback of phase coefficients at the each transport layer; respective quantization and feedback of amplitude coefficients corresponding to each antenna port subset; or respective quantization and feedback of phase coefficients corresponding to the each antenna port subset.

In an embodiment, the feedback state parameter includes at least one of: a number of amplitude coefficient quantization states or a number of phase coefficient quantization states.

In an embodiment, the feedback state parameter includes at least one of: whether to enable feedback of the G amplitude coefficients or whether to enable feedback of the K phase coefficients.

In an embodiment, the feedback state parameter includes at least one of: a feedback period of the G amplitude coefficients, a feedback period of the K phase coefficients, or a relationship between the feedback period of the G amplitude coefficients and the feedback period of the K phase coefficients.

In an embodiment, the feedback state parameter includes: a number of precoding vectors fed back in the channel information.

In an embodiment, the feedback state parameter includes at least one of: a relationship between the amplitude coefficients in the channel information and an antenna port; a relationship between the amplitude coefficients in the channel information and a transport layer; a relationship between the phase coefficients in the channel information and the antenna port; or a relationship between the phase coefficients in the channel information and the transport layer.

In an embodiment, the first determination module is further configured to determine the feedback state parameter of the channel information in at least one of the manners described below.

The feedback state parameter is determined according to the configuration signaling including higher-layer signaling and/or physical layer signaling and sent by a base station.

The feedback state parameter is determined according to a physical channel for feeding back the channel information and/or a physical channel format of the physical channel for feeding back the channel information.

The feedback state parameter is determined according to the channel information obtained by measuring a channel.

The feedback state parameter is determined according to a number of antenna ports and/or a number of reference signal ports.

This embodiment further provides a channel information feedback apparatus. The apparatus is used for implementing the method embodiment and preferred examples described above on a base station side. What has been described will not be repeated. As used below, the term "module" may be software, hardware or a combination thereof capable of implementing predetermined functions. The apparatus in the embodiment described below is In an embodiment implemented by software, but implementation by hardware or by a combination of software and hardware is also possible and conceived.

Figure 5:
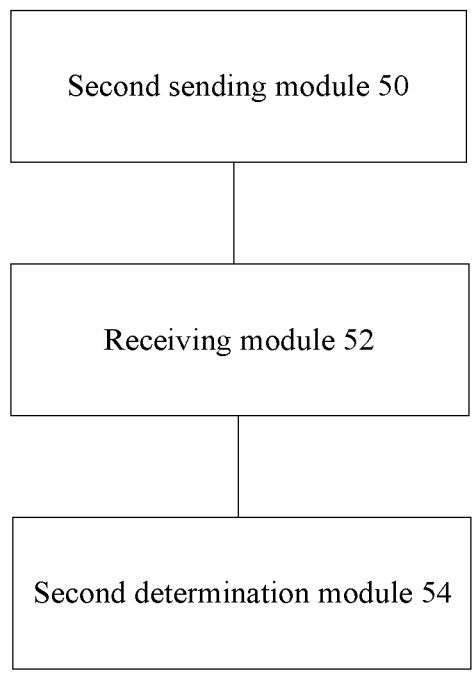
FIG. 5 a block diagram 2 of a channel information feedback apparatus according to the embodiment 2 of the present disclosure.

FIG. 5 a block diagram 2 of a channel information feedback apparatus according to the embodiment 2 of the present disclosure. As shown in FIG. 5, the apparatus is applied to a base station and includes a second sending module 50 and a receiving module 52.

The second sending module 50 is configured to send configuration signaling to a terminal. The configuration signaling is used for carrying a feedback state parameter of channel information and the channel information includes at least one of a number M of precoding vectors $v_1, v_2, \ldots, v_M$, a number G of amplitude coefficients $A_1, A_2, \ldots, A_G$, or a number K of phase coefficients $P_1, P_2, \ldots, P_K$, where M, G and K are all integers greater than or equal to 0.

The receiving module 52 is configured to receive the channel information fed back by the terminal according to the feedback state parameter.

In the above apparatus, the second sending module 50 sends the configuration signaling to the terminal and the receiving module 52 receives the channel information fed back by the terminal according to the feedback state parameter. The configuration signaling is used for carrying the feedback state parameter of the channel information and the channel information includes at least one of the M precoding vectors $v_1, v_2, \ldots, v_M$, the G amplitude coefficients $A_1, A_2, \ldots, A_G$, or the K phase coefficients $P_1, P_2, \ldots, P_K$, where M, G and K are all integers greater than or equal to 0. This reduces feedback overheads of a terminal in multi-path weighting or linear combination feedback so that the terminal may perform more targeted channel information feedback, reducing pilot overheads, improving feedback efficiency, and saving resources.

In an embodiment, the feedback state parameter includes at least a feedback mode, and the feedback mode includes at least one of: respective quantization and feedback of each of the precoding vectors, the amplitude coefficients and the phase coefficients; joint quantization and feedback of the precoding vectors and the amplitude coefficients; joint quantization and feedback of the precoding vectors and the phase coefficients; joint quantization and feedback of the amplitude coefficients and the phase coefficients; joint quantization and feedback of the precoding vectors, the amplitude coefficients and the phase coefficients; joint quantization and feedback of the amplitude coefficients and a CQI; joint quantization and feedback of the phase coefficients and the CQI; joint quantization and feedback of the amplitude coefficients and an RI; respective quantization and feedback of amplitude coefficients at each transport layer; respective quantization and feedback of phase coefficients at the each transport layer; respective quantization and feedback of amplitude coefficients corresponding to each antenna port subset; or respective quantization and feedback of phase coefficients corresponding to the each antenna port subset.

In an embodiment, the feedback state parameter includes at least one of: a number of amplitude coefficient quantization states or a number of phase coefficient quantization states.

In an embodiment, the feedback state parameter includes at least one of: whether to enable feedback of the G amplitude coefficients or whether to enable feedback of the K phase coefficients.

In an embodiment, the feedback state parameter includes at least one of: a feedback period of the G amplitude coefficients, a feedback period of the K phase coefficients, or a relationship between the feedback period of the G amplitude coefficients and the feedback period of the K phase coefficients.

In an embodiment, the feedback state parameter includes: a number of precoding vectors fed back in the channel information.

In an embodiment, the feedback state parameter includes at least one of: a relationship between the amplitude coefficients in the channel information and an antenna port; a relationship between the amplitude coefficients in the channel information and a transport layer; a relationship between the phase coefficients in the channel information and the antenna port; or a relationship between the phase coefficients in the channel information and the transport layer.

In an embodiment, as shown in FIG. 5, the apparatus further includes a second determination module 54. The second determination module 54 is configured to determine the feedback state parameter of the channel information in at least one of the manners described below. The feedback state parameter is determined according to a physical channel for feeding back the channel information and/or a physical channel format of the physical channel for feeding back the channel information. The feedback state parameter is determined according to a feedback state parameter of the channel information reported by the terminal. The feedback state parameter is determined according to a number of antenna ports and/or a number of reference signal ports.

Embodiment 3

Figure 6:
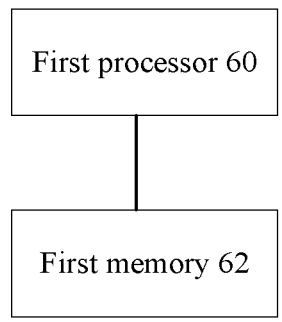
FIG. 6 is a structural diagram of a terminal according to an embodiment 3 of the present disclosure.

For a better understanding of the embodiments described above, this embodiment provides a terminal. FIG. 6 is a structural diagram of a terminal according to an embodiment 3 of the present disclosure. As shown in FIG. 6, the terminal includes: a first processor 60 and a first memory 62 configured to store instructions executable by the first processor 60. The first processor 60 is configured to perform, according to the instructions stored in the first memory 62, operations described below.

A feedback state parameter of channel information is determined. The channel information includes at least one of a number M of precoding vectors $v_1, v_2, \ldots, v_M$, a number G of amplitude coefficients $A_1, A_2, \ldots, A_G$, or a number K of phase coefficients $P_1, P_2, \ldots, P_K$, where M, G and K are all integers greater than or equal to 0.

The channel information is fed back according to the determined feedback state parameter.

In the above terminal, the first processor 60 determines the feedback state parameter of the channel information and feeds back the channel information according to the determined feedback state parameter. The channel information includes at least one of the M precoding vectors $v_1, v_2, \ldots, v_M$, the G amplitude coefficients $A_1, A_2, \ldots, A_G$, or the K phase coefficients $P_1, P_2, \ldots, P_K$, where M, G and K are all integers greater than or equal to 0. This reduces feedback overheads of a terminal in a multi-path weighting or linear combination feedback system so that the terminal may perform more targeted channel information feedback, reducing pilot overheads, improving feedback efficiency, and saving resources.

In an embodiment, the terminal determines the feedback state parameter in at least one of the manners described below.

The feedback state parameter is determined according to configuration signaling sent by a base station, where the configuration signaling includes at least one of higher-layer signaling or physical layer signaling. The feedback state parameter is determined according to a physical channel for feeding back the channel information and/or a physical channel format of the physical channel for feeding back the channel information. The feedback state parameter is determined according to the channel information obtained by measuring a channel. The feedback state parameter is determined according to a number of antenna ports and/or a number of reference signal ports.

In an embodiment, when the terminal determines the feedback state parameter of the channel information according to the channel information obtained by measuring the channel, the terminal sends the determined feedback state parameter to the base station.

In an embodiment, the feedback state parameter includes at least a feedback mode, and the feedback mode includes at least one of: respective quantization and feedback of each of the precoding vectors, the amplitude coefficients and the phase coefficients; joint quantization and feedback of the precoding vectors and the amplitude coefficients; joint quantization and feedback of the precoding vectors and the phase coefficients; joint quantization and feedback of the amplitude coefficients and the phase coefficients; joint quantization and feedback of the precoding vectors, the amplitude coefficients and the phase coefficients; joint quantization and feedback of the amplitude coefficients and a CQI; joint quantization and feedback of the phase coefficients and the CQI; joint quantization and feedback of the amplitude coefficients and an RI; respective quantization and feedback of amplitude coefficients at each transport layer; respective quantization and feedback of phase coefficients at the each transport layer; respective quantization and feedback of amplitude coefficients corresponding to each antenna port subset; or respective quantization and feedback of phase coefficients corresponding to the each antenna port subset.

In an embodiment, the feedback state parameter includes at least one of: a number of amplitude coefficient quantization states or a number of phase coefficient quantization states.

In an embodiment, the M precoding vectors are divided into a number L of groups, where precoding vectors in an I-th group have at least one of: a same number of amplitude coefficient quantization states or a same number of phase coefficient quantization states, where I and L are positive integers and $1 \leq I \leq L$.

In an embodiment, the number of amplitude coefficient quantization states and/or the number of phase coefficient quantization states are determined according to at least one of: the feedback mode of the channel information, the physical channel for feeding back the channel information, or the physical channel format of the physical channel for feeding back the channel information.

In an embodiment, the number of amplitude coefficient quantization states is $g_n$ and the number of phase coefficient quantization states is $r_k$, where n=1, 2, ..., G and k=1, 2, ..., K.

In an embodiment, numbers $g_1, g_2, \ldots, g_G$ of amplitude coefficient quantization states are a same integer or different integers, and numbers $r_1, r_2, \ldots, r_K$ of phase coefficient quantization states are a same integer or different integers.

In an embodiment, the feedback state parameter includes at least one of: whether to enable feedback of the G amplitude coefficients or whether to enable feedback of the K phase coefficients.

In an embodiment, the feedback state parameter further includes at least one of: enabling feedback of the G amplitude coefficients or not enabling feedback of the K phase coefficients.

In an embodiment, the feedback state parameter further includes enabling feedback of the G amplitude coefficients and enabling feedback of the K phase coefficients.

In an embodiment, whether to enable feedback of the G amplitude coefficients and/or the K phase coefficients is determined according to at least one of: the feedback mode of the channel information, the physical channel for feeding back the channel information, or the physical channel format of the physical channel for feeding back the channel information.

In an embodiment, the feedback state parameter includes at least one of: a feedback period of the G amplitude coefficients, a feedback period of the K phase coefficients, or a relationship between the feedback period of the G amplitude coefficients and the feedback period of the K phase coefficients.

In an embodiment, the feedback period of the G amplitude coefficients is $T_1$, the feedback period of the K phase coefficients is $T_2$, and $T_1$ and $T_2$ satisfy a constraint relationship $T_1=c*T_2$, where c is positive integer.

In an embodiment, c is determined in at least one of the following manners: configuration of the base station and an agreement between the base station and the terminal.

In an embodiment, the feedback period $T_1$ of the G amplitude coefficients is b times a feedback period of the RI and the feedback period $T_2$ of the K phase coefficients is d times the feedback period of the RI, where b and d are both positive integers and b≥d.

In an embodiment, b and d are determined in at least one of the following manners: the configuration of the base station and the agreement between the base station and the terminal.

In an embodiment, the feedback state parameter includes: a number of precoding vectors fed back in the channel information.

In an embodiment, the number M of precoding vectors is determined according to a number R of reference signal ports of the base station, where R is a positive integer.

In an embodiment, when the number of reference signal ports is less than $R_0$, the number M of precoding vectors is 0 and the terminal feeds back a number N of amplitude coefficients and the K phase coefficients, where K and N are both integers greater than or equal to 0 and $R_0$ is a positive integer.

In an embodiment, the number of precoding vectors fed back by the terminal is determined according to at least one of: the feedback mode of the channel information, the physical channel for feeding back the channel information, or the physical channel format of the physical channel for feeding back the channel information.

In an embodiment, the feedback state parameter includes at least one of: a relationship between the amplitude coefficients in the channel information and an antenna port; a relationship between the amplitude coefficients in the channel information and a transport layer; a relationship between the phase coefficients in the channel information and the antenna port; or a relationship between the phase coefficients in the channel information and the transport layer.

In an embodiment, the antenna port includes a plurality of ports $T_0, T_1, \ldots, T_{B-1}$, where amplitude coefficients and/or phase coefficients associated with a port $T_0$ to a port $T_{B/2-1}$ are consistent with amplitude coefficients and/or phase coefficients associated with a port $T_{B/2}$ to a port $T_{B-1}$, where B is a positive integer.

In an embodiment, when the transport layer includes a number L of layers, different layers of the L layers have at least one same amplitude coefficient, where L is a positive integer.

In an embodiment, when the transport layer includes the number L of layers, different layers of the L layers have at least one same phase coefficient, where L is a positive integer.

Figure 7:
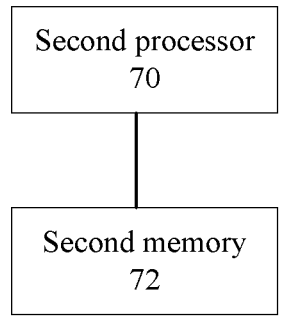
FIG. 7 is a structural diagram of a base station according to the embodiment 3 of the present disclosure.

For a better understanding of the embodiments described above, this embodiment further provides a base station. FIG. 7 is a structural diagram of a base station according to the embodiment 3 of the present disclosure. As shown in FIG. 7, the base station includes: a second processor 70 and a second memory 72 configured to store instructions executable by the second processor 70. The second processor 70 is configured to perform, according to the instructions stored in the second memory 72, operations described below.

Configuration signaling is sent to a terminal. The configuration signaling is used for carrying a feedback state parameter of channel information and the channel information includes at least one of a number M of precoding vectors $v_1, v_2, \ldots, v_M$, a number G of amplitude coefficients $A_1, A_2, \ldots, A_G$, or a number K of phase coefficients $P_1, P_2, \ldots, P_K$, where M, G and K are all integers greater than or equal to 0.

The channel information fed back by the terminal according to the feedback state parameter is received.

In the above base station, the second processor 70 sends the configuration signaling to the terminal and receives the channel information fed back by the terminal according to the feedback state parameter. The configuration signaling is used for carrying the feedback state parameter of the channel information and the channel information includes at least one of the M precoding vectors $v_1, v_2, \ldots, v_M$, the G amplitude coefficients $A_1, A_2, \ldots, A_G$, or the K phase coefficients $P_1, P_2, \ldots, P_K$, where M, G and K are all integers greater than or equal to 0. This reduces feedback overheads of a terminal in a multi-path weighting or linear combination feedback system so that the terminal may perform more targeted channel information feedback, reducing pilot overheads, improving feedback efficiency, and saving resources.

In an embodiment, the configuration signaling includes at least one of higher-layer signaling or physical layer signaling.

In an embodiment, before the base station sends the configuration signaling to the terminal, the base station determines the feedback state parameter carried in the configuration signaling in at least one of the manners described below.

The feedback state parameter is determined according to a physical channel for feeding back the channel information and/or a physical channel format of the physical channel for feeding back the channel information.

The feedback state parameter is determined according to a feedback state parameter of the channel information reported by the terminal.

The feedback state parameter is determined according to a number of antenna ports and/or a number of reference signal ports.

In an embodiment, the feedback state parameter includes at least a feedback mode, and the feedback mode includes at least one of: respective quantization and feedback of each of the precoding vectors, the amplitude coefficients and the phase coefficients; joint quantization and feedback of the precoding vectors and the amplitude coefficients; joint quantization and feedback of the precoding vectors and the phase coefficients; joint quantization and feedback of the amplitude coefficients and the phase coefficients; joint quantization and feedback of the precoding vectors, the amplitude coefficients and the phase coefficients; joint quantization and feedback of the amplitude coefficients and a CQI; joint quantization and feedback of the phase coefficients and the CQI; joint quantization and feedback of the amplitude coefficients and an RI; respective quantization and feedback of amplitude coefficients at each transport layer; respective quantization and feedback of phase coefficients at the each transport layer; respective quantization and feedback of amplitude coefficients corresponding to each antenna port subset; or respective quantization and feedback of phase coefficients corresponding to the each antenna port subset.

In an embodiment, the feedback mode is selected according to at least one of the physical channel for feeding back the channel information or the physical channel format of the physical channel for feeding back the channel information.

In an embodiment, the feedback state parameter includes at least one of: a number of amplitude coefficient quantization states or a number of phase coefficient quantization states.

In an embodiment, the M precoding vectors are divided into a number L of groups, where precoding vectors in an l-th group have at least one of: a same number of amplitude coefficient quantization states or a same number of phase coefficient quantization states, where l and L are positive integers and $1 \le l \le L$.

In an embodiment, the number of amplitude coefficient quantization states and/or the number of phase coefficient quantization states are determined according to at least one of: the feedback mode of the channel information, the physical channel for feeding back the channel information, or the physical channel format of the physical channel for feeding back the channel information.

In an embodiment, the number of amplitude coefficient quantization states is $g_n$ and the number of phase coefficient quantization states is $r_k$, where n=1, 2, ..., G and k=1, 2, ..., K.

In an embodiment, numbers $g_1, g_2, ..., g_G$ of amplitude coefficient quantization states are a same integer or different integers, and numbers $r_1, r_2, ..., r_K$ of phase coefficient quantization states are a same integer or different integers.

In an embodiment, the feedback state parameter includes at least one of: whether to enable feedback of the G amplitude coefficients or whether to enable feedback of the K phase coefficients.

In an embodiment, the feedback state parameter further includes at least one of: enabling feedback of the G amplitude coefficients or not enabling feedback of the K phase coefficients.

In an embodiment, the feedback state parameter further includes enabling feedback of the G amplitude coefficients and enabling feedback of the K phase coefficients.

In an embodiment, whether to enable feedback of the G amplitude coefficients and/or the K phase coefficients is determined according to at least one of: the feedback mode of the channel information, the physical channel for feeding back the channel information, or the physical channel format of the physical channel for feeding back the channel information.

In an embodiment, the feedback state parameter includes at least one of: a feedback period of the G amplitude coefficients, a feedback period of the K phase coefficients, or a relationship between the feedback period of the G amplitude coefficients and the feedback period of the K phase coefficients.

In an embodiment, the feedback period of the G amplitude coefficients is $T_1$, the feedback period of the K phase coefficients is $T_2$, and $T_1$ and $T_2$ satisfy a constraint relationship $T_1 = c \ast T_2$, where c is positive integer.

In an embodiment, c is determined in at least one of the following manners: configuration of the base station and an agreement between the base station and the terminal.

In an embodiment, the feedback period $T_1$ of the G amplitude coefficients is b times a feedback period of the RI and the feedback period $T_2$ of the K phase coefficients is d times the feedback period of the RI, where b and d are both positive integers and $b \ge d$.

In an embodiment, b and d are determined in at least one of the following manners: the configuration of the base station and the agreement between the base station and the terminal.

In an embodiment, the feedback state parameter includes: a number of precoding vectors fed back in the channel information.

In an embodiment, the number M of precoding vectors is determined according to a number R of reference signal ports of the base station, where R is a positive integer.

In an embodiment, when the number of reference signal ports is less than $R_0$, the number M of precoding vectors is 0 and the terminal feeds back a number N of amplitude coefficients and the K phase coefficients, where K and N are both integers greater than or equal to 0 and $R_0$ is a positive integer.

In an embodiment, the number of precoding vectors fed back by the terminal is determined according to at least one of: the feedback mode of the channel information, the physical channel for feeding back the channel information, or the physical channel format of the physical channel for feeding back the channel information.

In an embodiment, the feedback state parameter includes at least one of: a relationship between the amplitude coefficients in the channel information and an antenna port; a relationship between the amplitude coefficients in the channel information and a transport layer; a relationship between the phase coefficients in the channel information and the antenna port; or a relationship between the phase coefficients in the channel information and the transport layer.

In an embodiment, the antenna port includes a plurality of ports $T_0, T_1, ..., T_{B-1}$, where amplitude coefficients and/or phase coefficients associated with a port $T_0$ to a port $T_{B/2-1}$ are consistent with amplitude coefficients and/or phase coefficients associated with a port $T_{B/2}$ to a port $T_{B-1}$, where B is a positive integer.

In an embodiment, when the transport layer includes a number L of layers, different layers of the L layers have at least one same amplitude coefficient, where L is a positive integer.

In an embodiment, when the transport layer includes the number L of layers, different layers of the L layers have at least one same phase coefficient, where L is a positive integer.

Figure 8:
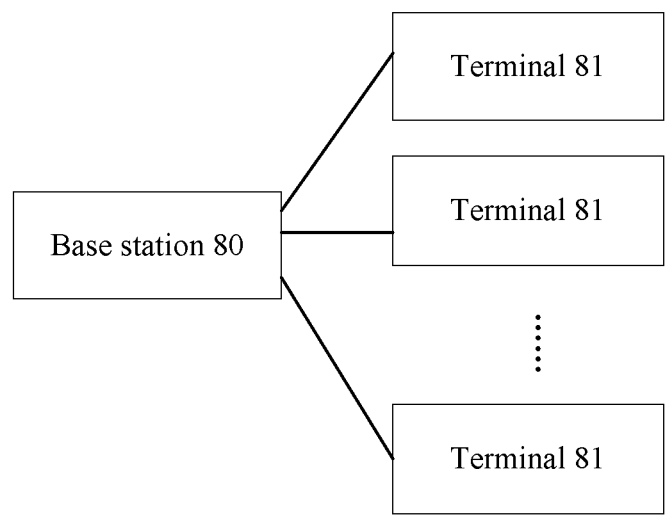
FIG. 8 is a block diagram of a feedback system according to the embodiment 3 of the present disclosure.

For a better understanding of the embodiments described above, this embodiment further provides a channel information feedback system. FIG. 8 is a block diagram of a feedback system according to the embodiment 3 of the present disclosure. As shown in FIG. 8, the system includes a base station 80 and at least one terminal 81. The base station 80 is configured to send configuration signaling to the at least one terminal. The configuration signaling is used for carrying a feedback state parameter of channel information and the channel information includes at least one of a number M of precoding vectors $v_1, v_2, ..., v_M$, a number G of amplitude coefficients $A_1, A_2, ..., A_G$, or a number K of phase coefficients $P_1, P_2, ..., P_K$, where M, G and K are all integers greater than or equal to 0.

The at least one terminal 81 is configured to receive the configuration signaling sent by the base station and feed back the channel information to the base station according to the feedback state parameter of the channel information carried in the configuration signaling.

In the above system, directional channel information feedback is performed between the base station and the terminal. This reduces feedback overheads of a terminal in a multi-path weighting or linear combination feedback system so that the terminal may perform more targeted channel information feedback, reducing pilot overheads, improving feedback efficiency, and saving resources.

In an embodiment, the feedback state parameter includes at least a feedback mode, and the feedback mode includes at least one of: respective quantization and feedback of each of the precoding vectors, the amplitude coefficients and the phase coefficients; joint quantization and feedback of the precoding vectors and the amplitude coefficients; joint quantization and feedback of the precoding vectors and the phase coefficients; joint quantization and feedback of the amplitude coefficients and the phase coefficients; joint quantization and feedback of the precoding vectors, the amplitude coefficients and the phase coefficients; joint quantization and feedback of the amplitude coefficients and a CQI; joint quantization and feedback of the phase coefficients and the CQI; joint quantization and feedback of the amplitude coefficients and an RI; respective quantization and feedback of amplitude coefficients at each transport layer; respective quantization and feedback of phase coefficients at the each transport layer; respective quantization and feedback of amplitude coefficients corresponding to each antenna port subset; or respective quantization and feedback of phase coefficients corresponding to the each antenna port subset.

In an embodiment, the feedback state parameter includes at least one of: a number of amplitude coefficient quantization states or a number of phase coefficient quantization states.

In an embodiment, the feedback state parameter includes at least one of: whether to enable feedback of the G amplitude coefficients or whether to enable feedback of the K phase coefficients.

In an embodiment, the feedback state parameter includes at least one of: a feedback period of the G amplitude coefficients, a feedback period of the K phase coefficients, or a relationship between the feedback period of the G amplitude coefficients and the feedback period of the K phase coefficients.

In an embodiment, the feedback state parameter includes: a number of precoding vectors fed back in the channel information.

In an embodiment, the feedback state parameter includes at least one of: a relationship between the amplitude coefficients in the channel information and an antenna port; a relationship between the amplitude coefficients in the channel information and a transport layer; a relationship between the phase coefficients in the channel information and the antenna port; or a relationship between the phase coefficients in the channel information and the transport layer.

In an embodiment, the at least one terminal determines the feedback state parameter of the channel information in at least one of the manners described below. The feedback state parameter is determined according to the configuration signaling and including higher-layer signaling and/or physical layer signaling and sent by the base station. The feedback state parameter is determined according to a physical channel for feeding back the channel information and/or a physical channel format of the physical channel for feeding back the channel information. The feedback state parameter is determined according to the channel information obtained by measuring a channel. The feedback state parameter is determined according to a number of antenna ports and/or a number of reference signal ports.

Embodiment 4

It is to be noted that if not in collision, the embodiments described herein and the features thereof may be combined with each other. In the embodiments of the present disclosure, the base station described above includes, but is not limited to, various wireless communication devices such as a macro base station, a micro base station, and a wireless access point. The terminal described above includes, but is not limited to, various wireless communication devices including a terminal such as a data card, a mobile phone, a laptop computer, a personal computer, a tablet computer, a personal digital assistant, and Bluetooth, a relay, a remote device, a wireless access point, and the like.

Specific Embodiment 1

This embodiment provides a manner for implementing configuration of channel information quantization and feedback. In a channel information feedback manner based on linear combination, a terminal feeds back M precoding vector information $\{v_1, v_2, \ldots, v_M\}$, N weighting coefficient amplitude information $\{a_1, a_2, \ldots, a_N\}$, and K weighting coefficient phase information $\{p_1, p_2, \ldots, p_K\}$, where M, N, and K are all integers greater than or equal to 0. Particularly, when N=K=M−1, a base station may construct the following precoding according to feedback parameters:

$$v = v_1 + a_1 e^{jp_1} v_2 + \ldots + a_{M-1} e^{jp_{M-1}} v_M.$$

A specific implementation method may include steps described below.

In step A1, the terminal selects a group of beams $\{v_1, v_2, \ldots, v_M\}$ from a precoding codebook according to configuration information of the base station and channel measurement.

In step A2, the terminal calculates quantized weighting coefficient amplitudes $\{a_1, a_2, \ldots, a_{M-1}\}$ and weighting coefficient phases $\{p_1, p_2, \ldots p_{M-1}\}$ according to a channel measurement result.

In step A3, the terminal feeds back a quantization result and a beam selection result to the base station.

In a practical quantization and feedback process, if the number of bits used for quantization and feedback is not optimized, huge feedback overheads will be caused. A way to optimize the number of quantization and feedback bits is to optimize the configuration of feedback states of different parameters. Specifically, the manners below are included.

A manner 1 is to configure whether to enable feedback of the weighting coefficient amplitudes. In the above-mentioned CSI feedback manner based on the linear combination, the weighting coefficient amplitudes and phases have different principles and importance. The weighting coefficient phases result from a multi-path delay and a multi-path random phase, and the weighting coefficient amplitudes mainly result from multi-path power gains and the like. In fact, the multi-path power gains are channel information that changes slowly, and the power of each codeword of the user may also be adjusted in whole by a CQI or a modulation and coding scheme (MCS). Therefore, for a certain user or scenario with limited feedback overheads, the base station may configure to not feed back the weighting coefficient amplitudes. This may reduce the feedback overheads despite a certain impact on practical performance. For a certain scenario or user with unlimited feedback overheads, the base station may enable feedback of the weighting coefficient amplitudes to acquire larger precoding gains based on fine feedback of the amplitude on each path.

A manner 2 is to configure whether to enable feedback of the weighting coefficient phases.

In some scenarios, a channel does not have a significant multi-path delay, but the multi-path amplitude information has a large impact. For example, in an indoor microcell scenario, direct paths exist between multiple transmission nodes and users, but power gains of the direct paths are greatly affected by a distance at a high operating frequency. At this time, the feedback of the multi-path amplitude information will bring larger gains, and the feedback of phases has no obvious gains. Therefore, in this scenario, feedback of the weighting coefficient phases may not be configured to reduce the feedback overheads.

A manner 3 is to optimize feedback states of amplitudes and phases.

Compared with the manner 1 and the manner 2, the manner 3 is to optimize configuration of feedback parameter states. The manner 3 includes multiple sub-manners.

Sub-Manner 3-1

Overall parameter states of the weighting coefficient amplitudes and phases are configured. For example, a number A of amplitude states and a number B of phase states are configured for each weighting coefficient. Such a configuration may enable the base station to flexibly configure feedback overheads and accuracy of the weighting coefficient amplitudes and phases for different terminals according to information such as a position, a direction, and a scenario of the different terminals. In addition to the configuration of the number of states, values of the states may also be configured to optimize the parameter states. For example, a value range $[\bar{a}_1, \underline{a}_1]$ of amplitude quantization and a value range $[\bar{p}_1, \underline{p}_1]$ of phase quantization are configured for a terminal in a certain scenario. In another scenario or for another terminal, a value range $[\bar{a}_1, \underline{a}_1]$ of amplitude quantization and a value range $[\bar{p}_1, \underline{p}_1]$ of phase quantization are configured. In this configuration manner, more accurate channel information can be acquired with a limited number of states, and joint optimization of CSI feedback overheads and accuracy can be obtained in conjunction with the optimization of the number of states.

Sub-Manner 3-2

In addition to the overall configuration of the weighting coefficient amplitude and phase states, a weighting coefficient state of each path may also be configured, that is, for a different path m, the weighting coefficient amplitude and phase states are configured for a precoding codeword $v_m$. Particularly, amplitude and phase weighting coefficients corresponding to a precoding codeword of a weaker path may be quantized with fewer states, and the reduction of quantization and feedback overheads for this path will not cause large performance losses. In addition, another more efficient configuration manner is to divide the M codewords selected in step A1 into L groups, and the codewords in the an first group are quantized through a weighting coefficients with a same number of states, where $1 \geq 1 \leq L$. In this way, the codewords with similar strength or weakness may be quantized through a same number of amplitude quantization states and a same number of phase quantization states, optimizing feedback overheads and reducing signaling overheads.

Sub-Manner 3-3

The number M of precoding codewords, the number N of quantized amplitudes, and the number K of quantized phases are optimized. In different scenarios, different numbers of codewords are selected to form CSI linear combinations, which can bring different precoding gains and different numbers of feedback and quantization bits. In an extreme case where M is 0, the selected precoding codewords do not need to be fed back. At this time, N and K are not 0, that is, only the quantized amplitudes and the quantized phases are fed back, which corresponds to a fully explicit feedback manner. That is, a channel matrix or a channel covariance matrix or each element of the channel characteristic vector is quantized and fed back. When there are few antenna ports, the feedback overheads are small. Therefore, the fully explicit feedback may be considered to be used when the number of antenna ports is less than a certain value.

Sub-Manner 3-4

The parameter feedback states in different polarization directions are optimized. When transmitting antennas are dual-polarized, amplitude and phase parameters in different polarization directions may have different channel characteristics. Due to impacts of a polarization leakage, a random phase and other factors, the phase parameters are generally different in different polarization directions, and the amplitude coefficients are different to a certain degree due to an impact of polarization projection. However, the configuration for the polarization projection is related to an overall scenario and an antenna configuration and has no dynamic change. Therefore, the base station may configure whether a same amplitude parameter is used in different polarization directions via signaling, so as to achieve joint optimization of performance and overheads.

Sub-Manner 3-5

The parameter feedback states at different transport layers are optimized. Since the base station dynamically adjusts a number of transport layers for each UE according to a current channel state, for a user at the edge of a cell, the base station is more likely to use one transport layer for transmission to ensure a transmission correct rate, and for a user at the center of the cell, the base station generally uses multiple transport layers for data transmission to enhance system throughput. Therefore, the base station may configure, via signaling, whether the UE feeds back the weighting amplitude coefficient of one transport layer or the weighting amplitude coefficients of multiple transport layers. In addition, in some scenarios, channels of a user at different transport layers have a relatively strong correlation. In this case, the base station may notify the UE via signaling that only the weighting coefficient of the first transport layer needs to be fed back, and the base station may construct the weighting coefficients of the remaining transport layers based on the weighting coefficient of the first transport layer, which may also reduce overheads.

Specific Embodiment 2

This embodiment provides a specific manner for configuring a channel information feedback state. The embodiment 1 presents content included in the channel information feedback state, which includes the followings:
whether to enable feedback of amplitude/phase coefficients;
a number of states for the amplitude/phase coefficients;
a number of precoding codewords and a number of amplitude/phase coefficient codewords;
a set of values of amplitude/phase states;
a relationship between the amplitude/phase coefficients and a polarization direction; and
a relationship between the amplitude/phase coefficients and a transport layer.

For the above-mentioned optimizable state parameters, a direct method is to configure the state parameters via signaling from a base station. Semi-static configuration may be performed via higher-layer signaling or dynamical configuration may be performed via physical layer signaling.

In addition, a terminal may also determine the feedback state itself according to a channel measurement result. After channel measurement, the terminal may accurately obtain the amplitude coefficients, the phase coefficients, and a number of states for the codewords as well as the relationship between these coefficients and the polarization direction/transport layer. Therefore, after the channel measurement, the terminal may notify the base station of the feedback states which may be updated once in a long time.

Both the above manners require certain feedback or signaling overheads. Another more effective way is to determine the feedback states through an agreement between the base station and the terminal. Several manners below may be used for reaching the agreement.

A manner 1 is binding with the number of antenna ports. In the case of a large number of antenna ports, feedback of the precoding codewords and the amplitude/phase coefficients may effectively reduce the feedback overheads because the large number of antenna ports may be reduced in dimension to a multi-path having fewer paths through the selection of the precoding codewords. However, in the case of a small number of antenna ports, a channel matrix itself has a small number of dimensions, and thus the overheads may not be greatly reduced. Therefore, whether to feed back the precoding codewords, that is, whether M is 0, may be determined according to the number of antenna ports. The precoding codewords are fed back in the case of a large number of antenna ports, and the precoding codewords are not fed back in the case of a small number of antenna ports.

A manner 2 is binding with a physical channel or physical channel format used for feedback. In the LTE, a PUCCH or PUSCH may be used for feedback. For the PUCCH, a PUCCH format 2 or a PUCCH format 3 may be used for CSI feedback. The PUCCH format 2 has a small capacity and the PUCCH format 3 has a large capacity. If the PUCCH format 2 is used for feedback, feedback bits are greatly limited. Therefore, the PUCCH format 2 is adapted to the feedback of a small number of states. For example, M, N, and K are decreased, the number of states of each amplitude/phase coefficient is decreased, a same amplitude/phase coefficient is used in different polarization directions, or the same amplitude/phase coefficient is used at different layers. In addition, in the PUCCH, since each subframe has a limited capacity, the overall channel parameters may be divided into multiple parts for feedback, and channel parameters similar in nature are put together for joint encoding and feedback, for example, respective quantization and feedback of each of the precoding vectors, the amplitude coefficients and the phase coefficients; joint quantization and feedback of the precoding vectors and the amplitude coefficients; joint quantization and feedback of the precoding vectors and the phase coefficients; joint quantization and feedback of the amplitude coefficients and the phase coefficients; joint quantization and feedback of the precoding vectors, the amplitude coefficients and the phase coefficients; joint quantization and feedback of the amplitude coefficients and a CQI; joint quantization and feedback of the phase coefficients and the CQI; and joint quantization and feedback of the amplitude coefficients and an RI.

If the PUSCH or the PUCCH format 3 is used for feedback, feedback with large overheads may be performed. At this time, M, N, and K may be increased, the number of states of each amplitude/phase coefficient may be increased, different amplitude/phase coefficients are used in different polarization directions, or the different amplitude/phase coefficients are used at different layers.

Specific Embodiment 3

This embodiment provides a manner for implementing configuration of channel information quantization and feedback. In this manner, a feedback period of amplitude coefficients and a feedback period of phase coefficients are configured to reduce overheads. In a channel information feedback manner based on linear combinations, a terminal feeds back M precoding vectors $\{v_1, v_2, \ldots, v_M\}$, N weighting coefficient amplitudes $\{a_1, a_2, \ldots, a_N\}$, and K weighting coefficient phases $\{p_1, p_2, \ldots, p_K\}$. Particularly, when N=K=M−1, a base station may construct the following precoding according to feedback parameters:

$$v = v_1 + a_1 e^{jp_1} v_2 + \ldots + a_{M-1} e^{jp_{M-1}} v_M.$$

For convenience of description, it is assumed that the feedback period of the phase coefficients is $T_p$, and the feedback period of the amplitude coefficients is $T_a$. Since amplitude information changes more slowly than phase information, $T_a = c \cdot T_p$ may be defined, where c is a positive integer. A specific implementation method may include steps described below with time passing by.

When TTI=$T_0$, steps below are included.

Steps on a terminal side are described below.

In step B1, the terminal selects a group of beams $\{v_1, v_2, \ldots, v_M\}$ from a precoding codebook according to configuration information of the base station and channel measurement.

In step B2, the terminal calculates quantized weighting coefficient amplitudes $\{a_1, a_2, \ldots, a_{M-1}\}$ and weighting coefficient phases $\{p_1, p_2, \ldots, p_{M-1}\}$ according to a channel measurement result.

In step B3, the terminal feeds back quantized amplitude coefficients and phase coefficients and a beam selection result to the base station.

Steps on a base station side are described below.

In step C1, the base station receives feedback from the terminal and determines the group of beams selected by the terminal as $\{v_1, v_2, \ldots, v_M\}$.

In step C2, the base station simultaneously receives the weighting coefficient amplitudes $\{a_1, a_2, \ldots, a_{M-1}\}$ and the weighting coefficient phases $\{p_1, p_2, \ldots, p_{M-1}\}$ fed back by the terminal.

In step C3, the base station constructs a precoding matrix in the following manner:

$$v = v_1 + a_1 e^{jp_1} v_2 + \ldots + a_{M-1} e^{jp_{M-1}} v_M.$$

When TTI=$T_0 + k \cdot T_p$, steps below are included, where k is an integer and $1 \leq k \leq c-1$.

Steps on the terminal side are described below.

In step D1, the terminal selects the group of beams $\{v_1, v_2, \ldots, v_M\}$ from the precoding codebook according to the configuration information of the base station and the channel measurement.

In step D2, the terminal calculates quantized weighting coefficient phases $\{p_1, p_2, \ldots, p_{M-1}\}$ according to the channel measurement result and the amplitude coefficients $\{a_1, a_2, \ldots, a_{M-1}\}$ when TTI=$T_0$.

In step D3, the terminal feeds back the quantized phase coefficients and the beam selection result to the base station.

Steps on the base station side are described below.

In step E1, the base station receives the feedback from the terminal and determines the group of beams selected by the terminal as $\{v_1, v_2, \ldots, v_M\}$.

In step E2, the base station receives weighted phase coefficients $\{p_1, p_2, \ldots, p_{M-1}\}$ fed back by the terminal.

In step E3, the base station constructs the precoding matrix $v = v_1 + a_1 e^{jP_1} v_2 + \ldots + a_{M-1} e^{jP_{M-1}} v_M$ based on the received phase coefficients and the amplitude coefficients $\{a_1, a_2, \ldots, a_{M-1}\}$ when $TTI = T_0$.

When $TTI = T_0 + k*T_p$, the terminal side and the base station side preform same operations as those when $TTI = T_0$.

In addition, another manner for configuring the feedback periods is to take a feedback period of an RI as a reference period. Since the RI changes slowly, it may be defined that the feedback period $T_p$ of the phase coefficients is d times the feedback period of the RI and the feedback period $T_a$ of the amplitude coefficients is b times the feedback period of the RI, where b and d are positive integers and b≥d.

Embodiment 5

An embodiment of the present disclosure further provides a storage medium. In this embodiment, the storage medium may be configured to store program codes for executing the channel information feedback method according to the embodiment 1 described above.

In this embodiment, the storage medium may be located in any one of a group of computer terminals in a computer network, or located in any one of a group of mobile terminals.

In this embodiment, the storage medium is configured to store program codes for executing steps described below.

In S1, a feedback state parameter of channel information is determined. The channel information includes at least one of a number M of precoding vectors $v_1, v_2, \ldots, v_M$, a number G of amplitude coefficients $A_1, A_2, \ldots, A_G$, or a number K of phase coefficients $P_1, P_2, \ldots, P_K$, where M, G and K are all integers greater than or equal to 0.

In S2, the channel information is fed back according to the determined feedback state parameter. An embodiment of the present disclosure further provides a storage medium. In this embodiment, the storage medium may be configured to store program codes for executing the channel information feedback method according to the embodiment 1 described above.

In this embodiment, the storage medium is configured to store program codes for executing steps described below.

In S1, configuration signaling is sent to a terminal. The configuration signaling is used for carrying a feedback state parameter of channel information and the channel information includes at least one of a number M of precoding vectors $v_1, v_2, \ldots, v_M$, a number G of amplitude coefficients $A_1, A_2, \ldots, A_G$, or a number K of phase coefficients $P_1, P_2, \ldots, P_K$, where M, G and K are all integers greater than or equal to 0.

In S2, the channel information fed back by the terminal according to the feedback state parameter is received.

The serial numbers of the embodiments described above of the present disclosure are merely for ease of description and do not indicate superiority and inferiority of the embodiments.

In the embodiments described above of the present disclosure, the description of each embodiment has its own emphasis. For a part not described in detail in one embodiment, reference may be made to a related description of other embodiments.

It should be understood that the technical content disclosed in the embodiments of the present application may be implemented in other ways. The apparatus embodiments described above are merely illustrative. For example, a unit division is merely a logical function division, and, in practice, the unit division may be implemented in other ways. For example, multiple units or components may be combined or may be integrated into another system, or some features may be ignored or not executed. Additionally, the presented or discussed mutual coupling, direct coupling or communication connections may be indirect coupling or communication connections via interfaces, units or modules, or may be electrical or in other forms.

The units described above as separate components may or may not be physically separated.

Components presented as units may or may not be physical units, i.e., may be located in one place or may be distributed on multiple network units.

Additionally, various functional units in each embodiment of the present disclosure may be integrated into one processing unit, or each unit may be physically present separately, or two or more units may be integrated into one unit. The integrated unit may be implemented by hardware or a software functional unit.

The integrated unit may be stored in a computer-readable storage medium if implemented in the form of the software functional unit and sold or used as an independent product. Based on this understanding, the present disclosure substantially, or the part contributing to the existing art, may be embodied in the form of a software product. The computer software product is stored on a storage medium and includes several instructions for enabling a computer device (which may be a personal computer, a server, a network device or the like) to execute all or part of the steps in the methods provided by the embodiments of the present disclosure. The preceding storage medium includes: a USB flash drive, a ROM, a RAM, a mobile hard disk, a magnetic disk, an optical disk or another medium capable of storing program codes.

The above are only preferred embodiments of the present disclosure and are not intended to limit the present disclosure. For those skilled in the art, the present disclosure may have various modifications and variations. Any modifications, equivalent substitutions, improvements and the like made within the spirit and principle of the present disclosure should fall within the scope of the present disclosure.

INDUSTRIAL APPLICABILITY

The embodiments of the present disclosure may be applied to a channel feedback process. The terminal determines the feedback state parameter of the channel information, where the channel information includes at least one of the M precoding vectors $v_1, v_2, \ldots, v_M$, the G amplitude coefficients $A_1, A_2, \ldots, A_G$, or the K phase coefficients $P_1, P_2, \ldots, P_K$, where M, G and K are all integers greater than or equal to 0; and the terminal feeds back the channel information according to the determined feedback state parameter. This reduces feedback overheads of a terminal in multi-path weighting or linear combination feedback so that the terminal may perform more targeted channel information feedback, reducing pilot overheads, improving feedback efficiency, and saving resources.

What is claimed is:

1. A channel information feedback method, comprising:
determining, by a terminal, a feedback state parameter of channel information, wherein the channel information comprises at least one of a number M of precoding vectors $v_1, v_2, \ldots, v_M$, a number G of amplitude coefficients $A_1, A_2, \ldots, A_G$, or a number K of phase coefficients $P_1, P_2, \ldots, P_K$, wherein M, G and K are all integers greater than or equal to 0; and feeding back, by the terminal, the channel information according to the determined feedback state parameter, wherein the feedback state parameter comprises at least one of:

a number of amplitude coefficient quantization states;

a number of phase coefficient quantization states;

a relationship between the amplitude coefficients in the channel information and an antenna port; or a relationship between the amplitude coefficients in the channel information and a transport layer.

2. The method of claim 1, wherein the terminal determines the feedback state parameter in at least one of the following manners:

the feedback state parameter is determined according to configuration signaling sent by a base station, wherein the configuration signaling comprises higher-layer signaling;

the feedback state parameter is determined according to a physical channel for feeding back the channel information; and the feedback state parameter is determined according to a number of reference signal ports.

3. The method of claim 1, wherein the feedback state parameter comprises at least a feedback mode, and the feedback mode comprises at least one of:

joint quantization and feedback of the precoding vectors, the amplitude coefficients and the phase coefficients; or joint quantization and feedback of the amplitude coefficients and a rank indication (RI).

4. The method of claim 1, wherein the M precoding vectors are divided into a number L of groups, wherein precoding vectors in an I-th group have at least one of: a same number of amplitude coefficient quantization states or a same number of phase coefficient quantization states, wherein I is a positive integer, L is an integer greater than 1, and $1 \leq I \leq L$.

5. The method of claim 4, wherein the number of amplitude coefficient quantization states and/or the number of phase coefficient quantization states for each of the L groups are determined according to a feedback mode of the channel information.

6. The method of claim 1, wherein the feedback state parameter comprises: a number of precoding vectors fed back in the channel information.

7. The method of claim 6, wherein the number M of precoding vectors is determined according to a number R of reference signal ports of a base station, wherein R is a positive integer.

8. The method of claim 1, wherein the antenna port comprises a plurality of ports $T_0, T_1, \ldots, T_{B-1}$, wherein amplitude coefficients and/or phase coefficients associated with a port $T_0$ to a port $T_{B/2-1}$ are consistent with amplitude coefficients and/or phase coefficients associated with a port $T_{B/2}$ to a port $T_{B-1}$, wherein B is an even number.

9. The method of claim 1, wherein when the transport layer comprises a number L of layers, different layers of the L layers have at least one same amplitude coefficient.

10. A channel information feedback apparatus, applied to a terminal, comprising:

a processor; and a memory for storing instructions executable by the processor, wherein the processor is configured to implement the channel information feedback method of claim 1.

11. A channel information feedback method, comprising:

sending, by a base station, configuration signaling to a terminal, wherein the configuration signaling is used for carrying a feedback state parameter of channel information and the channel information comprises at least one of a number M of precoding vectors $v_1, v_2, \ldots, v_M$, a number G of amplitude coefficients $A_1, A_2, \ldots, A_G$, or a number K of phase coefficients $P_1, P_2, \ldots, P_K$, wherein M, G and K are all integers greater than or equal to 0; and receiving the channel information fed back by the terminal according to the feedback state parameter, wherein the feedback state parameter comprises at least one of:

a number of amplitude coefficient quantization states;

a number of phase coefficient quantization states;

a relationship between the amplitude coefficients in the channel information and an antenna port; or a relationship between the amplitude coefficients in the channel information and a transport layer.

12. The method of claim 11, wherein before sending, by the base station, the configuration signaling to the terminal, the method further comprises: determining, by the base station, the feedback state parameter carried in the configuration signaling in at least one of the following manners:

the feedback state parameter is determined according to a physical channel for feeding back the channel information; and the feedback state parameter is determined according to a number of reference signal ports.

13. The method of claim 11, wherein the feedback state parameter comprises at least a feedback mode, and the feedback mode comprises at least one of:

joint quantization and feedback of the precoding vectors, the amplitude coefficients and the phase coefficients; or joint quantization and feedback of the amplitude coefficients and a rank indication (RI).

14. The method of claim 11, wherein the M precoding vectors are divided into a number L of groups, wherein precoding vectors in an I-th group have at least one of: a same number of amplitude coefficient quantization states or a same number of phase coefficient quantization states, wherein I is a positive integer, L is an integer greater than 1, and $1 \leq I \leq L$.

15. The method of claim 14, wherein the base station configures the number of amplitude coefficient quantization states and/or the number of phase coefficient quantization states for each of the L groups via signaling.

16. The method of claim 11, wherein the feedback state parameter comprises: a number of precoding vectors fed back in the channel information.

17. The method of claim 16, wherein the number M of precoding vectors is determined according to a number R of reference signal ports of the base station, wherein R is a positive integer.

18. The method of claim 11, wherein the antenna port comprises a plurality of ports $T_0, T_1, \ldots, T_{B-1}$, wherein amplitude coefficients and/or phase coefficients associated with a port $T_0$ to a port $T_{B/2-1}$ are consistent with amplitude coefficients and/or phase coefficients associated with a port $T_{B/2}$ to a port $T_{B-1}$, wherein B is an even number.

19. The method of claim 11, wherein when the transport layer comprises a number L of layers, different layers of the L layers have at least one same amplitude coefficient.

20. A channel information feedback apparatus, applied to a base station, comprising:

a processor; and a memory for storing instructions executable by the processor, wherein the processor is configured to implement the channel information feedback method of claim 11.

* * * * *